(12) United States Patent
Kawamura et al.

(10) Patent No.: US 9,143,320 B2
(45) Date of Patent: *Sep. 22, 2015

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Hiroaki Iwashita, Aichi (JP); Masaki Hayashi, Aichi (JP); Toshihiro Nagae, Aichi (JP); Hisashi Kato, Aichi (JP); Tetsuya Egawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 50 days.

This patent is subject to a terminal disclaimer.

(21) Appl. No.: 13/874,794

(22) Filed: May 1, 2013

(65) Prior Publication Data

US 2013/0301829 A1  Nov. 14, 2013

(30) Foreign Application Priority Data

May 10, 2012 (JP) ................................. 2012-108545

(51) Int. Cl.
  *H04L 9/00* (2006.01)
  *H04L 9/08* (2006.01)
(52) U.S. Cl.
  CPC .............. *H04L 9/0816* (2013.01); *H04L 9/083* (2013.01); *H04L 9/0822* (2013.01); *H04L 9/0869* (2013.01); *H04L 2209/84* (2013.01)
(58) Field of Classification Search
  CPC ........................................................ H04L 9/32
  USPC ................................. 713/150, 179; 726/10, 4
  See application file for complete search history.

(56) References Cited

U.S. PATENT DOCUMENTS 8,335,925 B2 * 12/2012 Taugbol ......................... 713/185
2003/0026427 A1   2/2003 Couillard
(Continued)

FOREIGN PATENT DOCUMENTS

| EP | 1282261 | 2/2003 |
| JP | 2004-300803 | 10/2004 |
| JP | 2011-020475 | 2/2011 |

OTHER PUBLICATIONS

U.S. Appl. No. 13/863,469 to Takahiro Shimizu et al., filed Apr. 16, 2013.

(Continued)

*Primary Examiner* — Thanhnga B Truong
*Assistant Examiner* — Khalil Naghdali
(74) *Attorney, Agent, or Firm* — Greenblum & Bernstein P.L.C.

(57) ABSTRACT

An electronic key registration system includes a controller of a communication subject, an initial electronic key that communicates with the communication subject and has an initial encryption key generation code, an additional electronic key that communicates with the communication subject, and an information center including an additional encryption key. The initial electronic key holds an initial encryption key generated from the initial encryption key generation code and a logic. The controller holds the logic and identification information of the communication subject. The controller acquires the initial encryption key generation code from the initial electronic key, generates an initial encryption key from the initial encryption key generation code and the logic held by the controller, and stores the initial encryption key. The information center sends the additional encryption key to the additional electronic key or the controller through a network.

10 Claims, 15 Drawing Sheets

(56) References Cited

U.S. PATENT DOCUMENTS

2008/0059806 A1* 3/2008 Kishida et al. ............... 713/186
2010/0333186 A1* 12/2010 Chan et al. .................... 726/10
2012/0124385 A1* 5/2012 Klasen et al. ................ 713/179

OTHER PUBLICATIONS

U.S. Appl. No. 13/871,333 to Daisuke Kawamura et al., filed Apr. 26, 2013.
U.S. Appl. No. 13/903,233 to Daisuke Kawamura et al., filed May 28, 2013.
U.S. Appl. No. 13/903,342 to Daisuke Kawamura et al., filed May 28, 2013.
European Search Report, date is Jul. 24, 2013.
Menezes A J et al., "Handbook of Applied Cryptography", Handbook of Applied Cryptography XX, XX, Oct. 1, 1996, XP002925297, pp. 498-499.

* cited by examiner

Fig.8

| Serviceman ID | Registration Tool ID |
|---|---|
| 1 ⌇ 100 | A ⌇ D |
| 101 ⌇ 200 | E ⌇ H |
| ⋮ | ⋮ |

| Electronic Key ID | In-Vehicle Device ID |
|---|---|
| 1 ⌇ 50 | A ⌇ E |
| 51 ⌇ 100 | F ⌇ J |
| ⋮ | ⋮ |

~54

ELECTRONIC KEY REGISTRATION SYSTEM

CROSS-REFERENCE TO RELATED APPLICATIONS

This application is based upon and claims the benefit of priority from prior Japanese Patent Application No. 2012-108545, filed on May 10, 2012, the entire contents of which are incorporated herein by reference.

BACKGROUND ART

The present invention relates to an electronic key registration system that registers an electronic key to a communication subject.

Japanese Laid-Open Patent Publication No. 2004-300803 discloses an electronic key system that performs encrypted communication to increase the confidentiality of an ID signal transmitted from an electronic key through a wireless connection. Since encrypted communication encrypts the ID signal transmitted from the electronic key through a wireless connection, it is difficult for a person who has acquired the ID signal in an unauthorized manner to obtain the ID of the electronic key.

The electronic key of such an electronic key system is registered in advance to a vehicle. The registration is performed by registering an ID, which is unique to the electronic key, in association with an encryption key to a controller installed in the vehicle. However, there is room for improvement in the level of security against unauthorized acquisition of the encryption key.

SUMMARY

It is an object of the present invention to provide an electronic key registration system that allows for registration of an electronic key to a communication subject, while reducing or obviating unauthorized acquisition of an encryption key.

One aspect of the present invention is an electronic key registration system including a controller installed in a communication subject. An initial electronic key performs encrypted communication with the communication subject. The initial electronic key includes an initial encryption key generation code. An additional electronic key that performs encrypted communication with the communication subject. The additional electronic key differs from the initial electronic key. An information center includes an additional encryption key. The initial electronic key is configured to hold an initial encryption key generated through a computation using the initial encryption key generation code and an initial encryption key generation logic. The controller holds the initial encryption key generation logic and identification information unique to the communication subject. The controller is programmed to acquire the initial encryption key generation code from the initial electronic key, generate an initial encryption key by performing a computation using the acquired initial encryption key generation code and the initial encryption key generation logic held by the controller, and store the generated initial encryption key. The information center is configured to send the additional encryption key to at least one of the additional electronic key and the controller through a network.

A further aspect of the present invention is a method for registering an initial electronic key and an additional electronic key that perform encrypted communication with a communication subject to a controller of the communication subject. The method includes an initial electronic key manufacturing step of storing an initial encryption key generation code and an initial encryption key, which is generated by performing a computation with the initial encryption key generation code and an initial encryption key generation logic, in the initial electronic key; an initial controller manufacturing step of storing identification information, which is unique to the communication subject, and the initial encryption key generation logic in the controller; an initial key registration step of acquiring the initial encryption key generation code from the initial electronic key, generating an initial encryption key by performing a computation with the acquired initial encryption key generation code and the initial encryption key generation logic held by the controller, and storing the generated initial encryption key in the controller; and an additional key registration step of transmitting an additional encryption key from an information center to at least one of the additional electronic key and the controller through a network.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a table associating serviceman IDs with registration tool IDs;

FIG. 9 is a table associating electronic key IDs with in-vehicle device IDs;

DETAILED DESCRIPTION OF EMBODIMENTS

An electronic key registration system according to one embodiment of the present invention will now be described.

Figure 1:
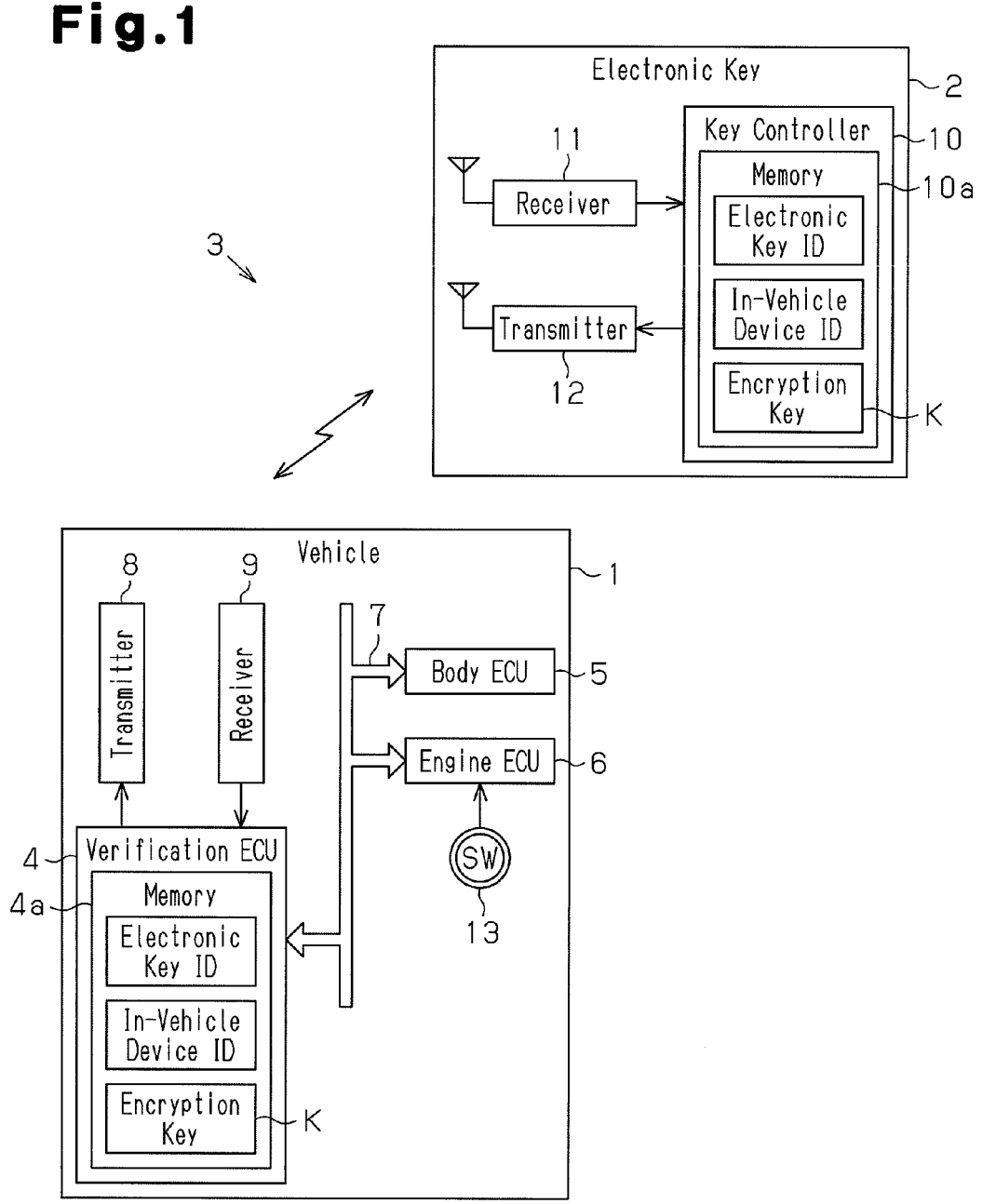
FIG. 1 is a block diagram of an electronic key system.
Figure 2:
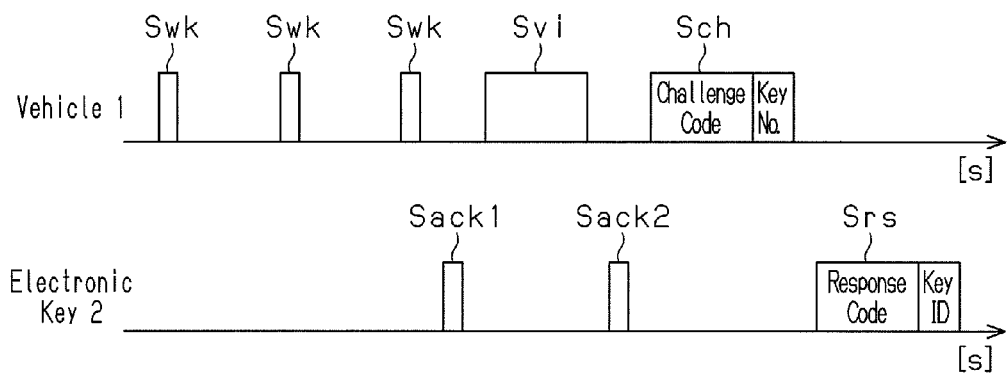
FIG. 2 is a timing chart of wireless signals used for communication between a vehicle and an electronic key.

Referring to FIG. 1, an electronic key system 3 includes a verification electronic control unit (ECU) 4, which is arranged in a vehicle 1, and an electronic key 2, which has an electronic key ID. The electronic key 2 receives a signal from the vehicle 1, and returns the electronic key ID in response. The electronic key system 3 verifies the electronic key 2 through bidirectional communication performed between the vehicle 1 and the electronic key 2. Any key may be used as the electronic key 2 as long as the key is capable of transmitting an electronic key ID through a wireless connection. The electronic key system 3 is, for example, a key-free-operation system and an immobilizer system. The vehicle 1 is one example of a communication subject.

An example in which the electronic key system 3 functions as a key-free-operation system will now be described. The vehicle 1 and the electronic key 2 perform verification processes through narrow band communication (communication distance of several meters). A verification ECU 4 receives and verifies the electronic key ID. The verification ECU 4 is connected to a bus 7 in the vehicle 1. A body ECU 5, which manages the power supplied to electronic components of the vehicle 1, and an engine ECU 6, which controls the engine, may be connected to the bus 7. The verification ECU 4 includes a memory 4a. The memory 4a stores the electronic key IDs of registered electronic keys, encryption keys K, an in-vehicle device ID (vehicle ID) that is an ID unique to the vehicle 1, and the like. The encryption keys K are associated with the electronic key IDs. For example, when a plurality of electronic keys are registered to the vehicle 1, multiple sets of an electronic key ID and an encryption key K are stored in the memory 4a. The verification ECU 4 is connected to one or more communication devices. In the example of FIG. 1, a low frequency (LF) transmitter 8 for transmitting radio waves on the LF band and an ultrahigh frequency (UHF) receiver 9 for receiving radio waves on the UHF band are connected to the verification ECU 4. The LF transmitter 8 includes a vehicle exterior transmitter, which forms a vehicle exterior communication area, and a vehicle interior transmitter, which forms a vehicle interior communication area. The verification ECU 4 is one example of a controller for a communication subject. The in-vehicle device ID is one example of identification information unique to the communication subject.

The electronic key 2 includes a key controller 10 that controls the electronic key 2. The key controller 10 includes a memory 10a that stores the electronic key ID, the in-vehicle device ID, and an encryption key K. The key controller 10 is connected to a receiver 11 that receives LF radio waves and a transmitter 12 that transmits UHF radio waves.

When the vehicle 1 is parked (e.g., vehicle doors locked and engine stopped), the vehicle exterior LF transmitter 8 transmits wake signals Swk in predetermined intervals to the vehicle exterior communication area, located several meters from the vehicle 1, and performs vehicle exterior smart communication. When the electronic key 2 is in the vehicle exterior communication area, the wake signal Swk activates the electronic key 2. Then, the electronic key 2 transmits an acknowledgement signal Sack1 to the vehicle 1 from the transmitter 12. When the receiver 9 of the vehicle 1 receives the acknowledgement signal Sack1, the verification ECU 4 transmits an in-vehicle device ID signal Svi from the vehicle exterior transmitter 8. Upon receipt of the in-vehicle device ID signal Svi, the electronic key 2 verifies the in-vehicle device ID. When the electronic key 2 accomplishes verification of the vehicle device ID, the electronic key 2 transmits an acknowledgement signal Sack2 to the vehicle 1.

Then, the verification ECU 4 transmits a challenge Sch to the electronic key 2 from the transmitter 8 to perform challenge-response verification. The challenge Sch includes a challenge code and a key number. The challenge code is changed for each transmission. The key number indicates the number of the electronic key 2 in order of registration to the vehicle 1. Upon receipt of the challenge Sch, the electronic key 2 first performs key number verification. When the key number is verified, the electronic key 2 performs a calculation with the received challenge code and the encryption key K of the electronic key 2 to generate a response code. The electronic key 2 then transmits a response Srs, including the response code and the electronic key ID of the electronic key 2, to the vehicle 1. The verification ECU 4 of the vehicle 1 performs a calculation with the received challenge code and the encryption key K of the verification ECU 4 to generate and hold a response code. Then, the verification ECU 4 uses the held response code to verify the response code in the response Srs received from the electronic key 2 (response verification). Further, the verification ECU 4 verifies the electronic key ID in the response Srs (electronic key ID verification). When the response verification and the electronic key ID verification are both accomplished, the verification ECU 4 determines that smart verification (vehicle external smart verification) has been accomplished and permits or performs locking or unlocking of the vehicle doors with the body ECU 5.

When, for example, a courtesy switch (not shown) detects the entrance of a driver into the vehicle 1, the verification ECU 4 transmits a wake signal Swk to the vehicle interior communication area from the transmitter 8 and starts in-vehicle smart communication. Preferably, the vehicle interior communication area is formed to extend throughout the entire interior of the vehicle 1. The electronic key 2 that has received the wake signal Swk in the vehicle 1 performs vehicle interior smart verification with the verification ECU 4. When vehicle interior smart verification is accomplished, the verification ECU 4 permits power and engine-related operations with an engine switch 13.

The immobilizer system performs wireless communication between the vehicle 1 and the electronic key 2 within a short distance (e.g., communication distance of approximately ten centimeters) to verify the electronic key 2. The electronic key 2 may be driven by induced power generated from immobilizer system radio waves transmitted from the vehicle 1. This allows the electronic key 2 to perform immobilizer system communication without a power supply. The short-distance wireless communication may be performed, for example, in compliance with a communication standard such as the near-field communication (NFC) standard.

Figure 3:
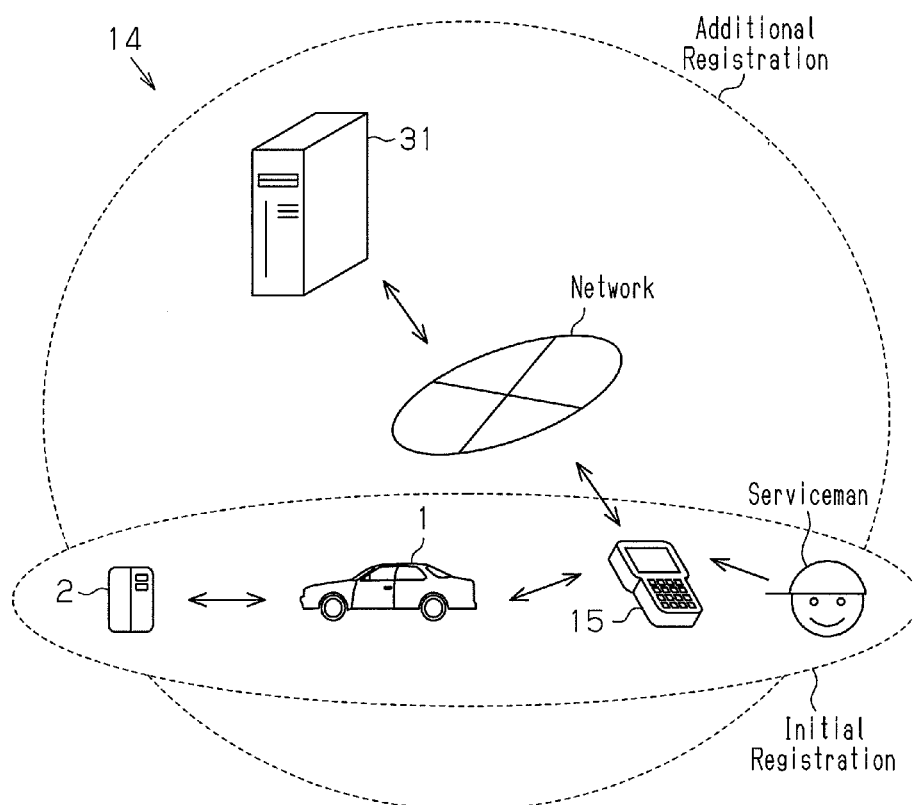
FIG. 3 is a block diagram of an electronic key registration system.

FIG. 3 shows an electronic key registration system 14 that registers the electronic key 2 to the vehicle 1. The electronic key registration system 14 allows for initial registration and additional registration to be performed. The initial registration is performed to register an electronic key to the vehicle 1 for the first time. The additional registration is performed to register an additional electronic key to the vehicle 1 (e.g., verification ECU 4), for example, after the vehicle 1 is shipped out of a factory. An electronic key that is first registered to the vehicle 1 may be referred to as an initial electronic key 2a. An electronic key that is additionally registered to the vehicle 1 may be referred to as an additional electronic key 2b or an extra electronic key. The initial electronic key 2a may be referred to as a master key. The additional electronic key 2b may be referred to as a sub-key. In one example, an initial registration is performed in a factory before the vehicle 1 is shipped out, and the additional registration is performed in an approved shop, such as a dealer or an auto repair garage. The initial registration may be performed in accordance with the SEED registration protocol that uses a dedicated registration code (SEED code Cr shown in FIG. 4). The additional registration may be performed using a network registration protocol that uses a network. The SEED code Cr is one example of an initial encryption key generation code.

Figure 4:
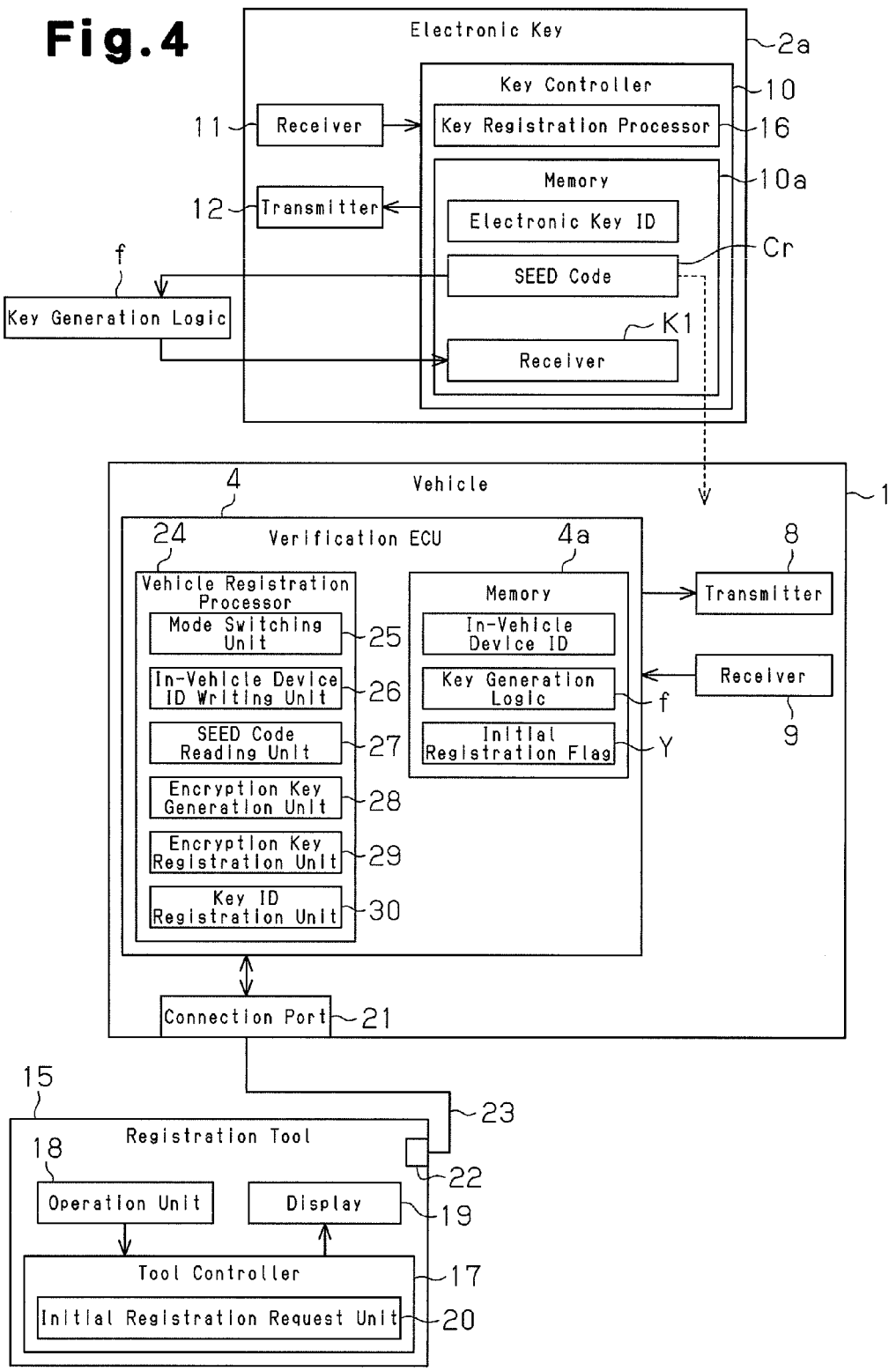
FIG. 4 is a block diagram illustrating initial registration of an electronic key.

Referring to FIG. 4, in the SEED registration protocol, to generate an encryption key K1 that is registered to the initial electronic key 2a, the electronic key 2a transmits the SEED code Cr to the vehicle 1. The verification ECU 4 of the vehicle 1 performs a computation with the received code Cr to generate the encryption key K1. Then, the verification ECU 4 stores the encryption key K1. In this manner, the initial registration does not transmit the encryption key K1 between the electronic key 2a and the verification ECU 4. Instead, the electronic key 2a and the verification ECU 4 use the SEED code Cr to generate and register the encryption key K1. This reduces or obviates theft of the encryption key K1 during the initial registration. In the illustrated example, the electronic key 2a deletes the SEED code Cr after transmitting the SEED code Cr to the vehicle 1.

Registration that is in accordance with the SEED registration protocol is performed at a location that is approved in advance such as a factory. The SEED registration protocol uses the SEED code Cr to register the electronic key 2a to the verification ECU 4 of the vehicle 1 but does not use an ID unique to the vehicle 1 such as the in-vehicle device ID.

The key controller 10 of the electronic key 2a includes a key registration processor 16 that processes key registration in the electronic key 2a. The SEED code Cr is stored in advance in the memory 10a of the electronic key 2a. The SEED code Cr is used only when registering an electronic key to the vehicle 1 for the first time. Different electronic keys have different SEED codes.

A registration tool 15 that may be used for the SEED registration protocol will now be described. The registration tool 15 includes a tool controller 17, which controls the registration tool 15, an operation unit 18, which detects registration operations carried out by a user, and a display 19, which shows various screens. The tool controller 17 includes an initial registration request unit 20 that transmits an initial registration request to the vehicle 1 in accordance with the detection of the operation unit 18. For example, when the operation unit 18 detects an operation for registering an electronic key to the vehicle 1 for the first time, the initial registration request unit 20 sends an initial registration request to the vehicle 1 to switch the operation mode of the verification ECU 4 to a first registration mode. When switched to the first registration mode, the verification ECU 4 starts an initial registration process.

The registration tool 15 includes a connector 22 connected to a connection port 21 of the vehicle 1 by a cable 23. The registration tool 15 is capable of performing data communication with the verification ECU through a wired connection.

The verification ECU 4 of the vehicle 1 includes a vehicle registration processor 24 that processes key registration in the vehicle 1. The memory 4a of the verification ECU 4 stores an encryption key generation logic f to generate an encryption key K1. When a registration permission flag Y is set to the memory 4a, the verification ECU 4 is permitted to start initial registration of the electronic key 2a to the electronic key 2a. The encryption key generation logic f may be referred to as an initial encryption key generation logic.

The vehicle registration processor 24 includes a mode switching unit 25, an in-vehicle device ID writing unit 26, a SEED code reading unit 27, an encryption key generation unit 28, an encryption key registration unit 29, and a key ID registration unit 30. When receiving an initial registration request from the registration tool 15, the mode switching unit 25 switches the operation mode of the verification ECU 4 to an initial registration mode.

When the verification ECU 4 is in the initial registration mode, the in-vehicle device ID writing unit 26 transmits the in-vehicle device ID of the verification ECU 4 to the electronic key 2a through wireless connection. The electronic key 2a holds the received in-vehicle device ID.

The SEED code reading unit 27 obtains the SEED code Cr from the electronic key 2a. The encryption key generation unit 28 generates the encryption key K1 from the SEED code Cr. The encryption key registration unit 29 registers the generated encryption key K1 to the memory 4a of the verification ECU 4.

In the illustrated example, the registration permission flag Y is set to the memory 4a when there are no electronic key IDs registered to the verification ECU 4. In this case, initial registration of the electronic key 2a is allowed. In one example, the SEED code reading unit 27 transmits a SEED code request to the electronic key 2a and obtains the SEED code Cr from the electronic key 2a through a wireless connection. The encryption key generation unit 28 performs a computation with the SEED code Cr and the encryption key generation logic f to generate an encryption key K1. The encryption key registration unit 29 and the key ID registration unit 30 stores the generated encryption key K1 and the electronic key ID of the electronic key 2a in association with each other to perform initial registration of the electronic key 2a.

After storing the encryption key K1 to the memory 4a, the encryption key registration unit 29 prohibits use of the encryption key generation logic f thereby avoiding subsequent initial registrations. The initial registration may also be prohibited when the verification ECU 4, the registration tool 15, or the electronic key 2a detects a predetermined prohibition operation. For example, a predetermined prohibition operation may be repetitive activation and deactivation of an engine switch of the vehicle 1 for a predetermined number of times (e.g., twenty).

Figure 5:
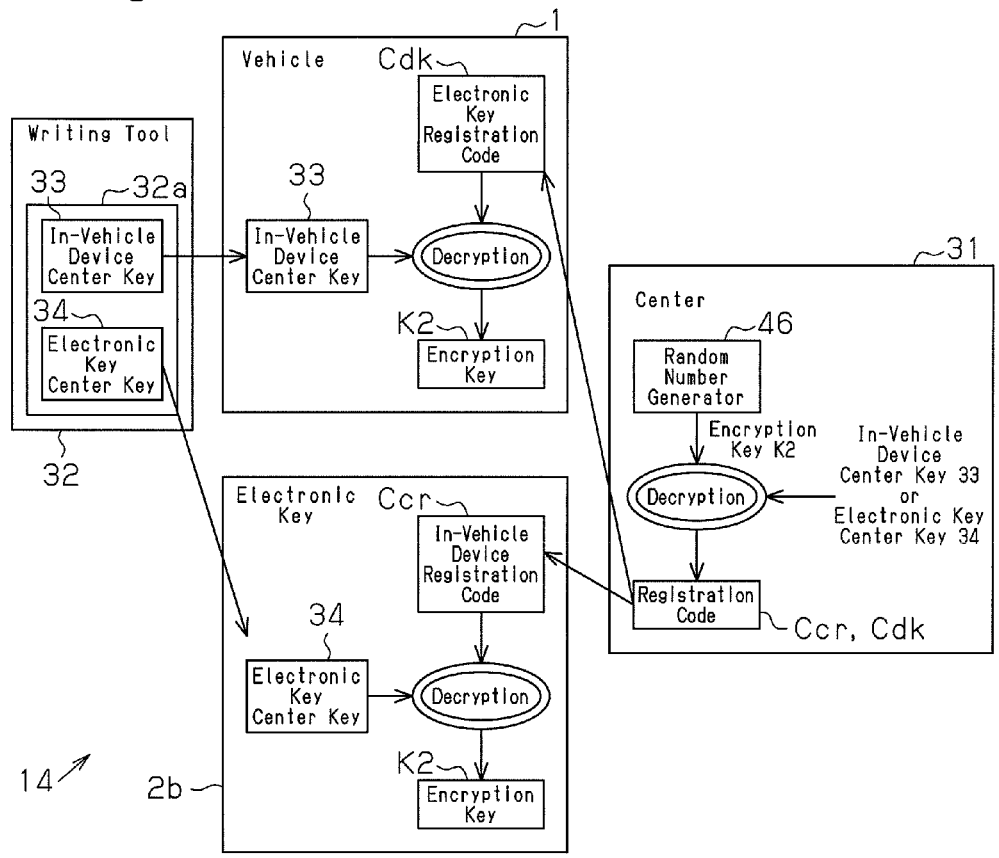
FIG. 5 is a block diagram illustrating additional registration of an electronic key.

The network registration protocol will now be described. Referring to FIG. 5, to register an electronic key in accordance with the network registration protocol, the electronic key registration system 14 uses the information center 31 and a writing tool 32 that are connected to a network. The information center 31 is capable of wireless connection communication. The writing tool 32 is stored in a location that is off-limits to unauthorized personnel such as a manufacturing factory of the electronic key 2 and/or the verification ECU 4. The vehicle 1, the electronic key 2b, the registration tool 15, the information center 31, and the writing tool 32 cooperate with one another to register the electronic key 2b to the vehicle 1. In the network registration protocol, an encryption key K2 of the additional electronic key 2b is not directly transmitted to the vehicle 1 from the electronic key 2b when the encryption key K2 is registered to the vehicle 1.

The writing tool 32 includes a memory 32a that stores an in-vehicle device center key 33 and an electronic key center key 34. The in-vehicle device center key 33 is used when additionally registering the encryption key K2 to the verification ECU 4. The electronic key center key 34 is used when additionally registering the encryption key K2 to the electronic key 2b. Since the writing tool 32 is stored in a location that is off-limits to unauthorized personnel, the possibility is low of the in-vehicle device center key 33 and the electronic key center key 34 being stolen from the writing tool 32. The in-vehicle device center key 33 is one example of a controller-dedicated key. The electronic key center key 34 is one example of an additional electronic key-dedicated key.

The vehicle 1 and the information center 31 both hold the in-vehicle device center key 33. Different in-vehicle device center keys 33 are assigned to different vehicles. When registering the encryption key K2 to the vehicle 1 and the electronic key 2b, the in-vehicle device center key 33 serves as an encryption key that encrypts data communication performed between the verification ECU 4 and the information center 31. The electronic key 2b and the information center 31 both hold the electronic key center key 34. Different electronic key center keys 34 are assigned to different electronic keys 2b.

When registering the encryption key K2 to the vehicle 1 and the electronic key 2b, the electronic key center key 34 serves as an encryption key that encrypts data communication performed between the electronic key 2b and the information center 31.

Figure 6:
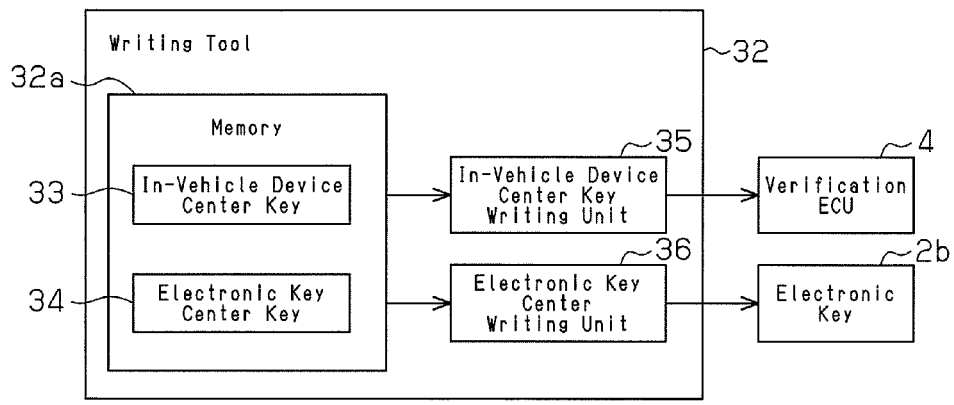
FIG. 6 is a block diagram of a writing tool.

As shown in FIG. 6, the writing tool 32 includes an in-vehicle device center key writing unit 35 and an electronic key center key writing unit 36. The in-vehicle device center key writing unit 35 write the in-vehicle device center key 33 to the vehicle 1 (verification ECU 4). The electronic key center key writing unit 36 writes the electronic key center key 34 to the electronic key 2b. The writing tool 32 may be arranged, for example, on a manufacturing line of the vehicle 1. In the preferred example, the in-vehicle device center key writing unit 35 directly transmits the in-vehicle device center key 33 by a wired connection to the verification ECU 4 on the manufacturing line. Further, the electronic key center key writing unit 36 directly transmits the electronic key center key 34 by wired connection to the key controller 10 of the electronic key 2b on the manufacturing line.

Figure 7:
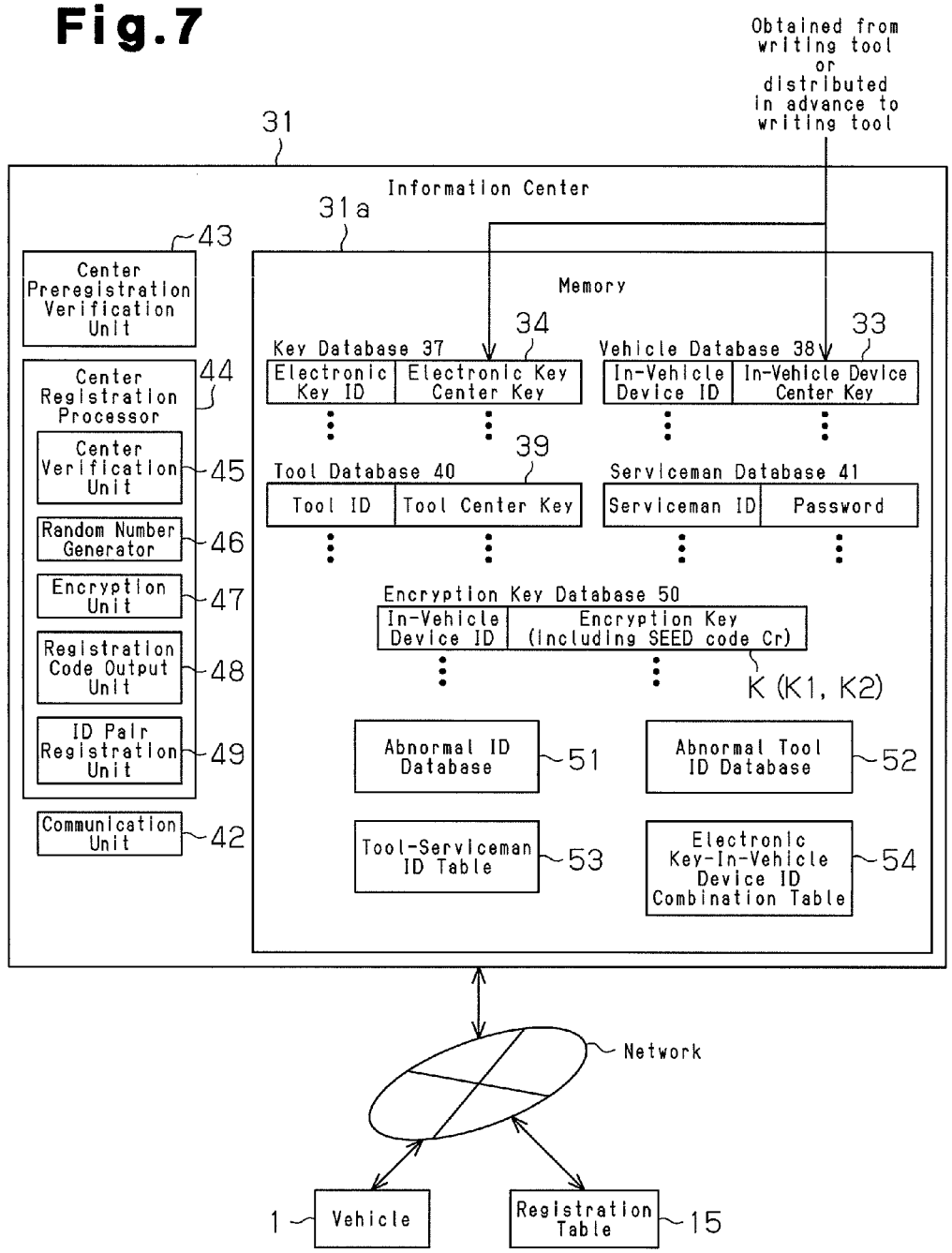
FIG. 7 is a block diagram of an information center.

The information center 31 will now be described with reference to FIG. 7. The information center 31 includes a memory 31a storing a key database 37 and a vehicle database 38. Sets of an electronic key ID and an electronic key center key 34 are registered to the key database 37. Sets of an in-vehicle device ID and an in-vehicle device center key 33 are registered to the vehicle database 38. As described above, the in-vehicle device center key 33 of the information center 31 is identical to the in-vehicle device center key 33 of the verification ECU 4. Further, the electronic key center key 34 of the information center 31 is identical to the electronic key center key 34 of the electronic key 2b.

The information center 31 may obtain the in-vehicle device center key 33 and the electronic key center key 34 from the writing tool 32. In another example, the information center 31 distributes the in-vehicle device center key 33 and the electronic key center key 34 to the writing tool 32. In a non-restrictive example, the in-vehicle device center key 33 and the electronic key center key 34 may be manually input with an input device to the information center 31 and the writing tool 32.

In the illustrated example, the memory 31a of the information center 31 stores a tool database 40. Sets of a tool ID of a registration tool 15 and a tool center key 39 are registered to the tool database 40. The information center 31 refers to the tool database 40 to determine whether or not the registration tool 15 related to the registration of the encryption key K2 has been approved. In this example, the use of an approved registration tool 15 is one condition for registration of the additional electronic key 2b. When registering the encryption key K2 to the vehicle 1, the tool center key 39 serves as an encryption key that encrypts data communication performed between the registration tool 15 and the information center 31. Different tool center keys 39 are assigned to different registration tools 15. The registration tool ID may be a serial number added to each registration tool 15 when the registration tool 15 is manufactured.

In the illustrated example, the memory 31a of the information center 31 includes a serviceman database 41. Sets of a serviceman ID and a password are registered to the memory 31a. The information center 31 refers to the serviceman database 41 to determine whether or not the registration of the encryption key K2 is performed by an approved serviceman. In this example, registration by an approved serviceman is one condition for registration of the additional electronic key 2b. The serviceman ID is, for example, a registration number of an employee affiliated with a company or an entity approved by the electronic key registration system 14. The password is set by, for example, a serviceman when applying for approval. The serviceman verification performed by the serviceman ID and the password is just one example. For example, biometric verification based on fingerprints or voice may be employed to perform serviceman verification. IC card verification may also be employed.

The information center 31 includes a communication unit 42 that performs bidirectional communication through wireless connection with the vehicle 1 and the registration tool 15. The communication unit 42 is capable of communicating with the registration tool 15 through network communication such as Internet protocol (IP) communication.

The information center 31 includes a center preregistration verification unit 43 that verifies a communication peer. When challenge-response verification is accomplished between the information center 31 and the registration tool 15, the center preregistration verification unit 43 switches the operation mode of the information center 31 to an additional registration mode.

Further, the information center 31 includes a center registration processor 44 that processes registration of the encryption key K2 after entering the additional registration mode. The center registration processor 44 includes a center verification unit 45, a random number generator 46, an encryption unit 47, a registration code output unit 48, and an ID pair registration unit 49.

In the additional registration mode, the center verification unit 45 verifies a communication peer. When the verification is accomplished, the center verification unit 45 permits additional registration of the electronic key 2b to the vehicle 1.

The random number generator 46 generates a random number as the encryption key K2 used by the electronic key system 3. In this manner, the information center 31 generates and manages the encryption key K2 used in the electronic key system 3.

The encryption unit 47 encrypts the in-vehicle device ID, the electronic key ID, and the encryption key K2 with the in-vehicle device center key 33 of the memory 31a to generate an in-vehicle device registration code Ccr. Further, the encryption unit 47 encrypts the in-vehicle device ID, the electronic key ID, and the encryption key K2 with the electronic key center key 34 in the memory 31a to generate an electronic key registration code Cdk. The in-vehicle registration code Ccr and the electronic key registration code Cdk each include encrypted information of the in-vehicle device ID, the electronic key ID, and the encryption key K2. Thus, to register the encryption key K2 to the vehicle 1 and the electronic key 2, the in-vehicle device registration code Ccr and the electronic key registration code Cdk are decrypted. The in-vehicle device registration code Ccr is one example of an additional controller decryption code. The electronic key registration code Cdk is one example of an additional electronic key decryption code.

The registration code output unit 48 provides the in-vehicle device registration code Ccr and the electronic key registration code Cdk, which are generated by the encryption unit 47, through, for example, the communication unit 42.

The ID pair registration unit 49 registers the encryption key K2 to the information center 31 in association with the vehicle 1 and the electronic key 2b. For example, when normal registration of the encryption key K2 to the vehicle 1 and the electronic key 2b is completed, the ID pair registration unit 49 stores a set of the in-vehicle device ID and the electronic key ID of the vehicle 1 and the electronic key 2b having the same registered encryption key K2 to the memory 31a. In this manner, the in-vehicle device ID and the electronic key ID are associated with each other and stored as a pair in the memory 31a.

The memory 31a of the information center 31 includes an abnormal ID database 51, an abnormal tool ID database 52, a tool-serviceman ID table 53, and an electronic key-in-vehicle device ID combination table 54. The abnormal ID database 51 stores, for example, an in-vehicle device ID of a stolen vehicle or an electronic key ID registered to another vehicle. The abnormal tool ID database 52 stores, for example, an abnormal tool ID such as an ID of a stolen registration tool 15.

Referring to FIG. 8, the tool-serviceman ID table 53 shows the corresponding relationship of serviceman IDs and registration tool IDs. Referring to FIG. 9, the electronic key-in-vehicle device ID combination table 54 shows the corresponding relationship of electronic key IDs and in-vehicle device IDs.

Figure 10:
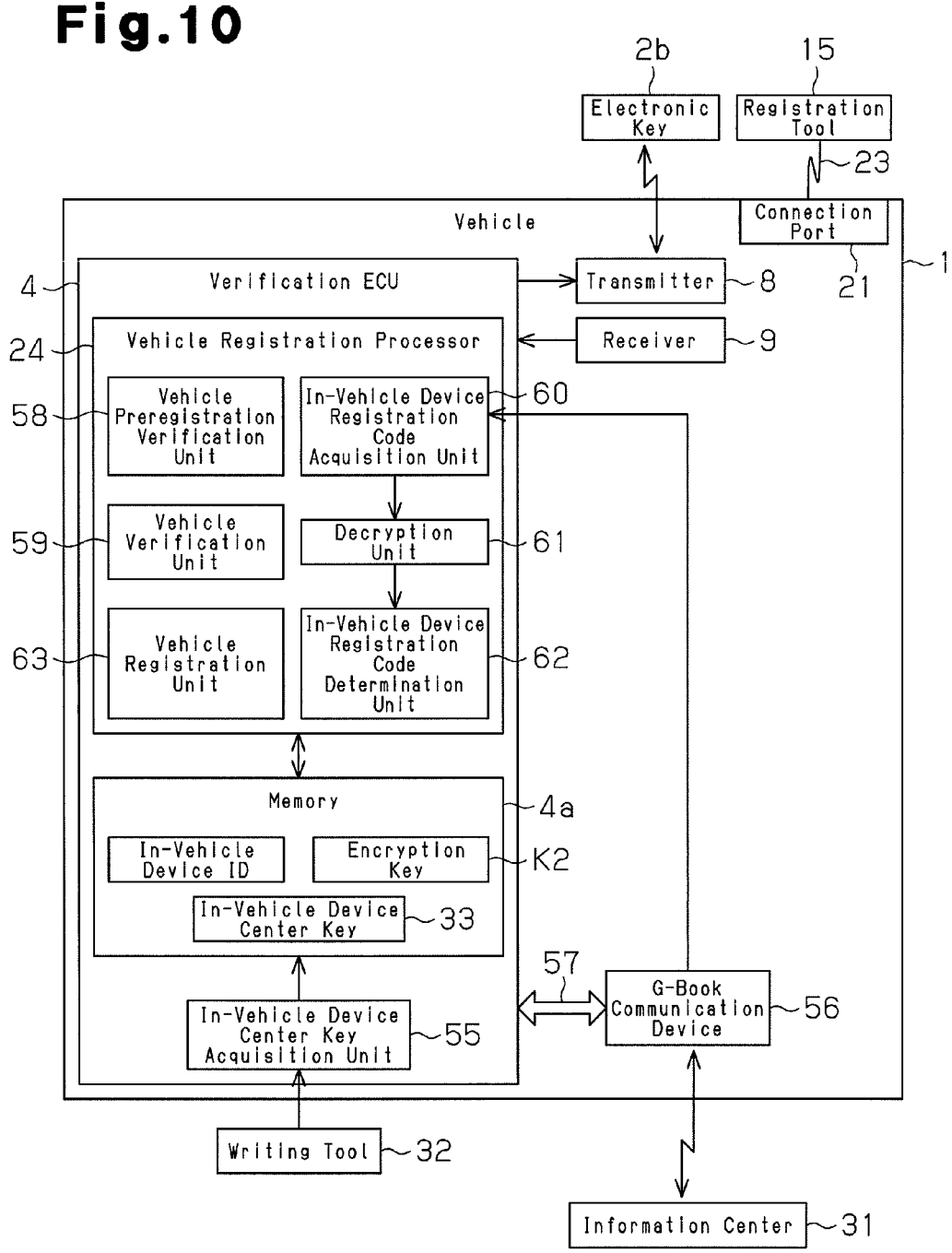
FIG. 10 is a block diagram of the vehicle.

Referring to FIG. 10, the verification ECU 4 includes an in-vehicle device center key acquisition unit 55 that obtains the in-vehicle device center key 33 from the writing tool 32 and stores the in-vehicle device center key 33 in the memory 4a.

The vehicle 1 is capable of performing bidirectional communication with the information center 31 through the registration tool 15 that is connected to the connection port 21. The in-vehicle device registration code Ccr transmitted from the information center 31 is provided to the connection port 21 through the registration tool 15. The vehicle 1 may include a communication device that communicates directly with the information center 31. The communication unit may be a G-Book communication device 56 connected to the verification ECU 4 by the bus 57.

The vehicle registration processor 24 includes a vehicle preregistration verification unit 58, a vehicle verification unit 59, an in-vehicle device registration code acquisition unit 60, a decryption unit 61, an in-vehicle device registration code determination unit 62, and a vehicle registration unit 63. The vehicle preregistration verification unit 58 verifies a communication peer before entering the additional registration mode. The vehicle verification unit 59 performs various verifications in cooperation with a communication peer during the additional registration mode. The in-vehicle device registration code acquisition unit 60 acquires the in-vehicle device registration code Ccr from the information center 31 through a wireless connection. The decryption unit 61 decrypts the in-vehicle device registration code Ccr acquired by the in-vehicle device registration code acquisition unit 60. The in-vehicle device registration code determination unit 62 determines whether or not the decrypted in-vehicle device registration code Ccr is correct.

When challenge-response verification is accomplished between the verification ECU 4 and the information center 31 through the registration tool 15, the vehicle preregistration verification unit 58 switches the operation mode of the verification ECU 4 to the additional registration mode. In the additional registration mode, the vehicle verification unit 59 applies for verification of the electronic key 2b in the additional registration mode to the information center 31 through the registration tool 15.

The in-vehicle device registration code acquisition unit 60 acquires the in-vehicle device registration code Ccr, which is transmitted from the information center 31, with the G-Book (Trademark) communication device 56. The decryption unit 61 decrypts the in-vehicle device registration code Ccr, which is acquired by the in-vehicle device registration code acquisition unit 60 from the writing tool 32, with the in-vehicle device center key 33, which is acquired by the in-vehicle device center key acquisition unit 55 from the information center 31. The in-vehicle device registration code Ccr obtained from the information center 31 is correctly decrypted as long as the in-vehicle device center key 33 included in the in-vehicle device registration code Ccr obtained from the information center 31 is the same as the in-vehicle device center key 33 obtained from the writing tool 32. The in-vehicle device registration code determination unit 62 determines that the in-vehicle device registration code Ccr is correct when the decryption unit 61 correctly decrypts the in-vehicle device generation code Ccr and, additionally, the in-vehicle device ID included in the decrypted data conforms to the in-vehicle device ID of the vehicle 1.

When the in-vehicle device registration code Ccr is correct, the vehicle registration unit 63 registers the encryption key K2, which is obtained by decrypting the in-vehicle device registration code Ccr, to the vehicle 1. The encryption key K2 is stored in the memory 4a as a verification key for the vehicle 1.

Figure 11:
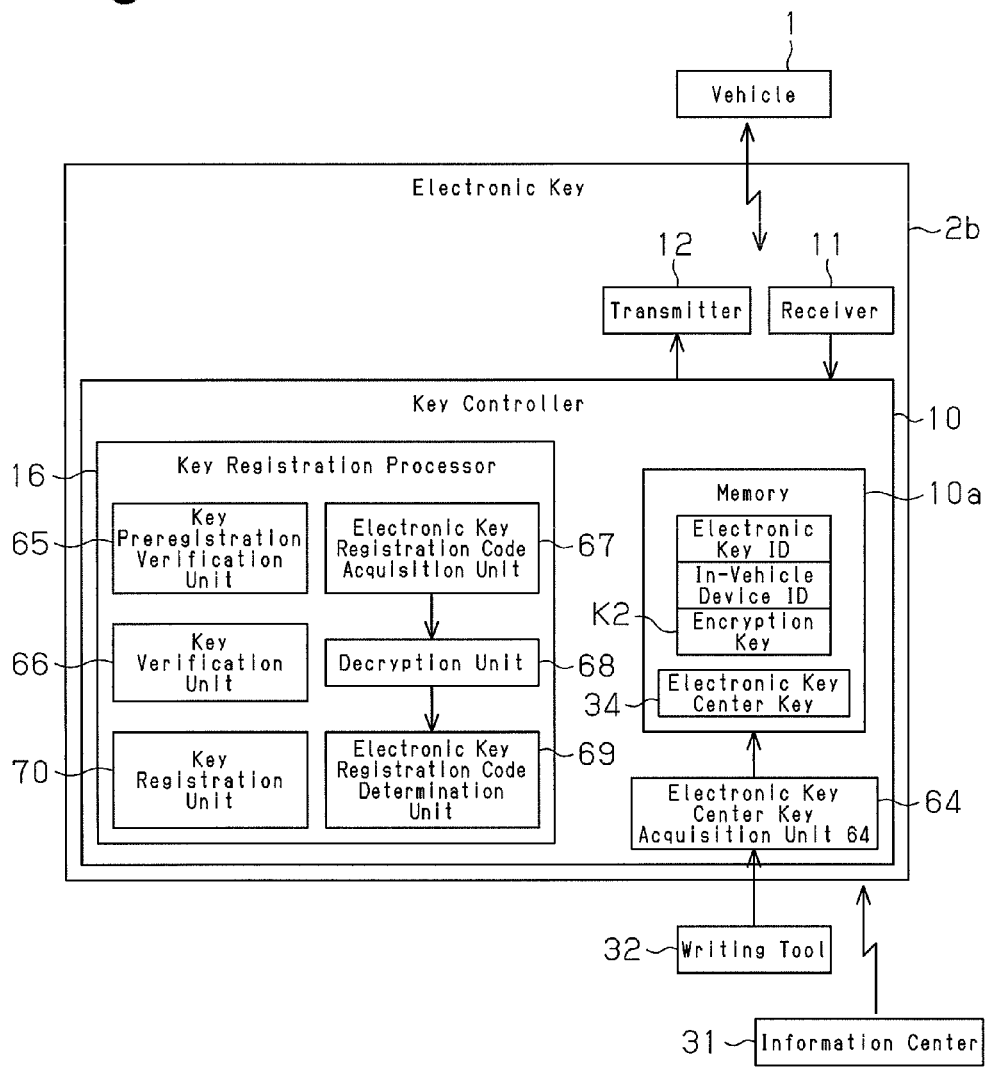
FIG. 11 is a block diagram of the electronic key.

Referring to FIG. 11, the key controller 10 of the electronic key 2b includes an electronic key center key acquisition unit 64 that acquires the electronic key center key 34 from the writing tool 32. The electronic key center key acquisition unit 64 stores the electronic key center key 34, which is acquired from the writing tool 32, to the memory 10a.

The key registration processor 16 includes a key preregistration verification unit 65, a key verification unit 66, an electronic key registration code acquisition unit 67, a decryption unit 68, an electronic key registration code determination unit 69, and a key registration unit 70. Before entering the additional registration mode, the key preregistration verification unit 65 verifies the communication peer of the electronic key 2b and switches the electronic key 2b to the additional registration mode.

The key verification unit 66 verifies a communication peer during the additional registration mode.

The electronic key registration code acquisition unit 67 acquires an electronic key registration code Cdk from the information center 31 through the receiver 11. The decryption unit 61 decrypts the electronic key registration code Cdk, which is acquired by the electronic key registration code acquisition unit 67 from the information center 31, with the electronic key center key 34, acquired by the electronic key center key acquisition unit 64 from the writing tool 32. The electronic key registration code Cdk obtained from the information center 31 is correctly decrypted as long as the electronic key center key 34 included in the electronic key registration code Cdk is the same as the electronic key center key 34 obtained from the writing tool 32. The electronic key registration code determination unit 69 determines that the electronic key registration code Cdk is correct when the decryption unit 61 correctly decrypts the electronic key generation code Cdk and, additionally, the electronic key ID included in the decrypted data conforms to the electronic key ID of the electronic key 2.

When the electronic key registration code Cdk is correct, the key registration unit 70 registers the encryption key K2, which is obtained from the electronic key registration code Cdk, to the electronic key 2b. The encryption key K2 is stored in the memory 10a as a verification key for the electronic key 2b.

Figure 12:
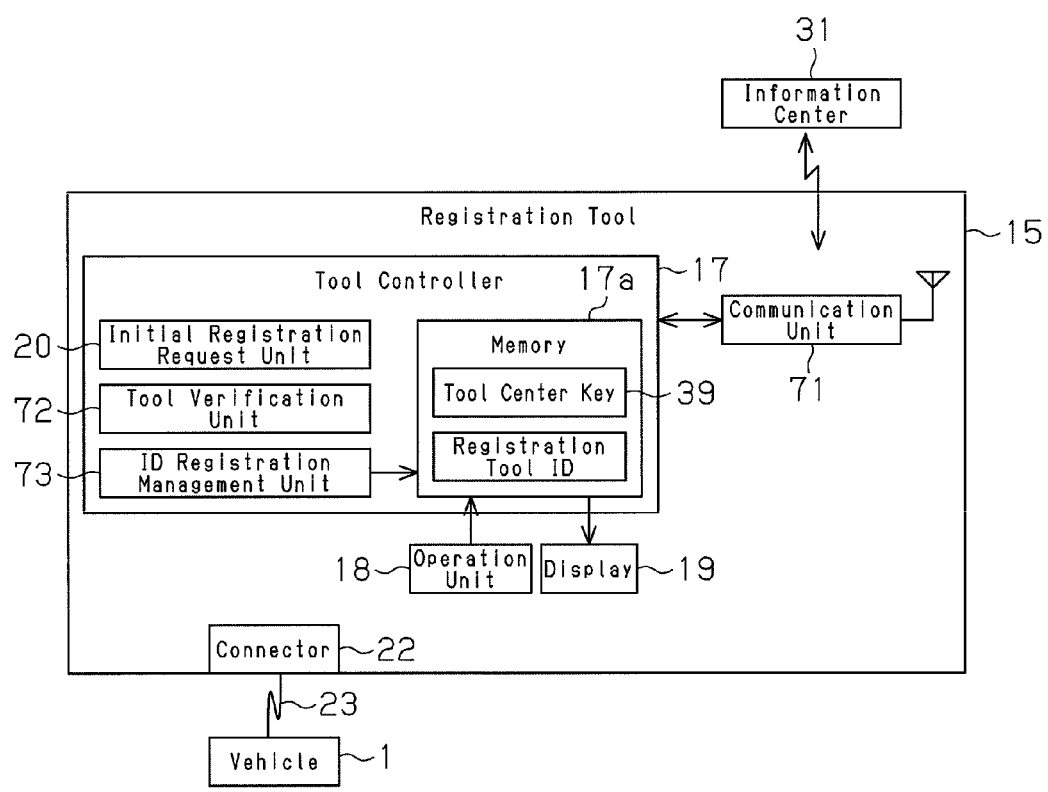
FIG. 12 is a block diagram of the registration tool.

Referring to FIG. 12, the registration tool 15 includes a communication unit 71 that transmits and receives various radio waves. The registration tool is capable of performing bidirectional communication through wireless communication with the information center 31. The registration tool 15 may also be connected to the vehicle 1 by the cable 23 for communication through a wired connection. The registration tool 15 is a hand-held type that can be manually held when the electronic key 2b is additionally registered to the vehicle 1.

The memory 17a of the tool controller 17 registers a tool center key 39 that is identical to the tool center key 39 registered to the information center 31. This associates the registration tool 15 with the information center 31. Further, the memory 17a of the tool controller 17 stores a registration tool ID that is unique to the registration tool 15.

The tool controller 17 includes a tool verification unit 72 and an ID registration management unit 73. The tool verification unit 72 verifies the communication peer of the registration tool 15. The tool verification unit 72 performs a wired connection communication with the vehicle 1 through the cable 23.

The ID registration management unit 73 stores a registration ID, provided from the operation unit 18 or through a wireless connection communication, in the memory 17a. This registers the registration tool ID to the registration tool 15.

The operation of the electronic key registration system 14 will now be described.

The operation of the electronic key registration system 14 will now be described.

The registration of a first electronic key to the vehicle 1, which has no registered electronic key IDs, will now be described with reference to FIGS. 4 and 13. Referring to FIG. 4, when the vehicle 1 is manufactured, the in-vehicle device ID and the encryption key generation logic f are stored in the memory 4a of the verification ECU 4 (initial controller manufacturing step). The registration permission flag Y that permits initial registration of the electronic key 2a to the verification ECU 4 is set in the memory 4a of the verification ECU 4.

Further, the electronic key 2a that is first registered to the verification ECU 4 is manufactured by storing the SEED code Cr and the encryption key K1 in the memory 10a (initial electronic key manufacturing step). The encryption key K1 of the electronic key 2a is generated by performing a computation with the SEED code Cr and the encryption key generation logic f that are stored in the memory 10a. Then, the encryption key K1 is stored in the memory 10a.

Figure 13:
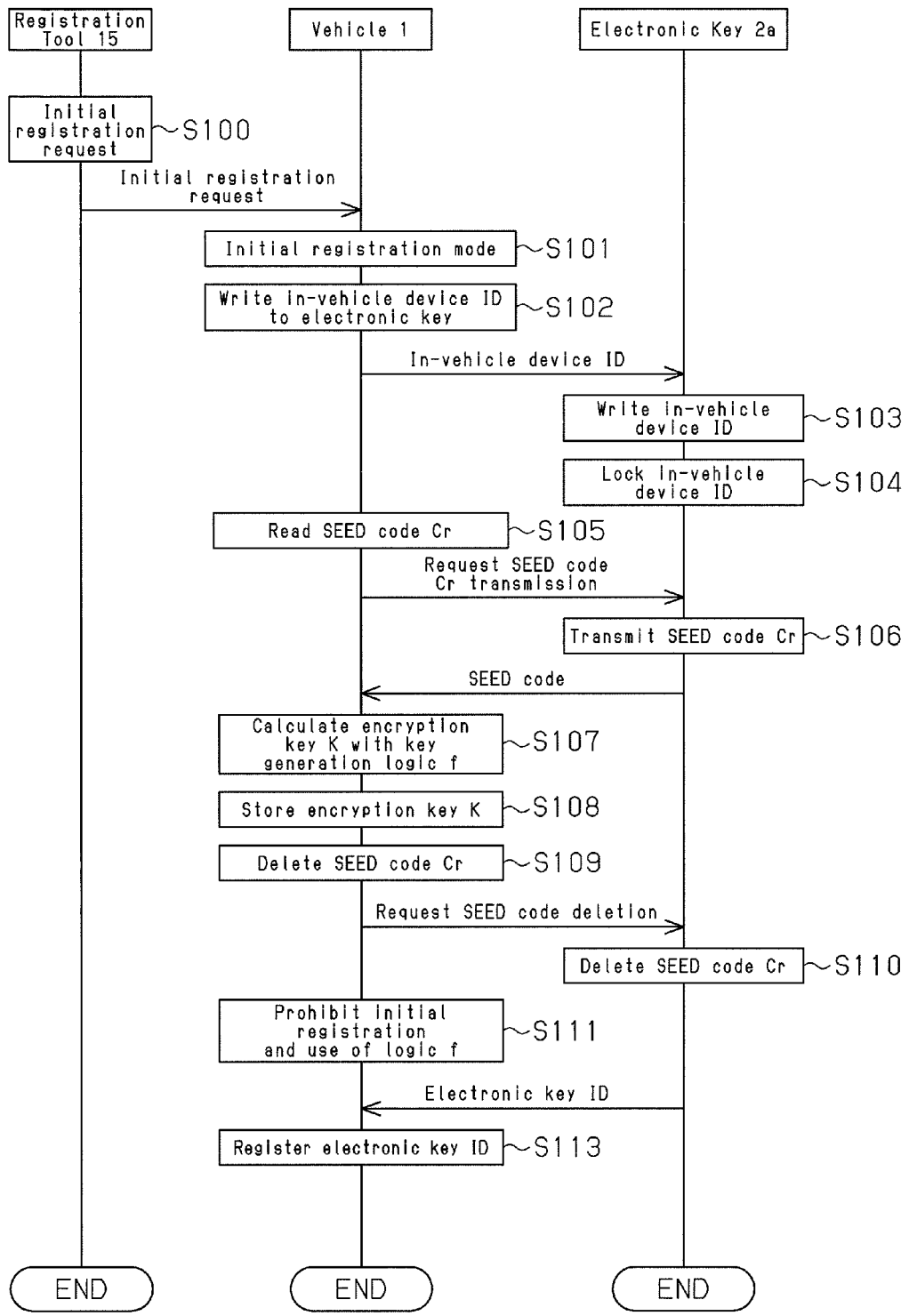
FIG. 13 is a flowchart of an initial registration.
Figure 14:
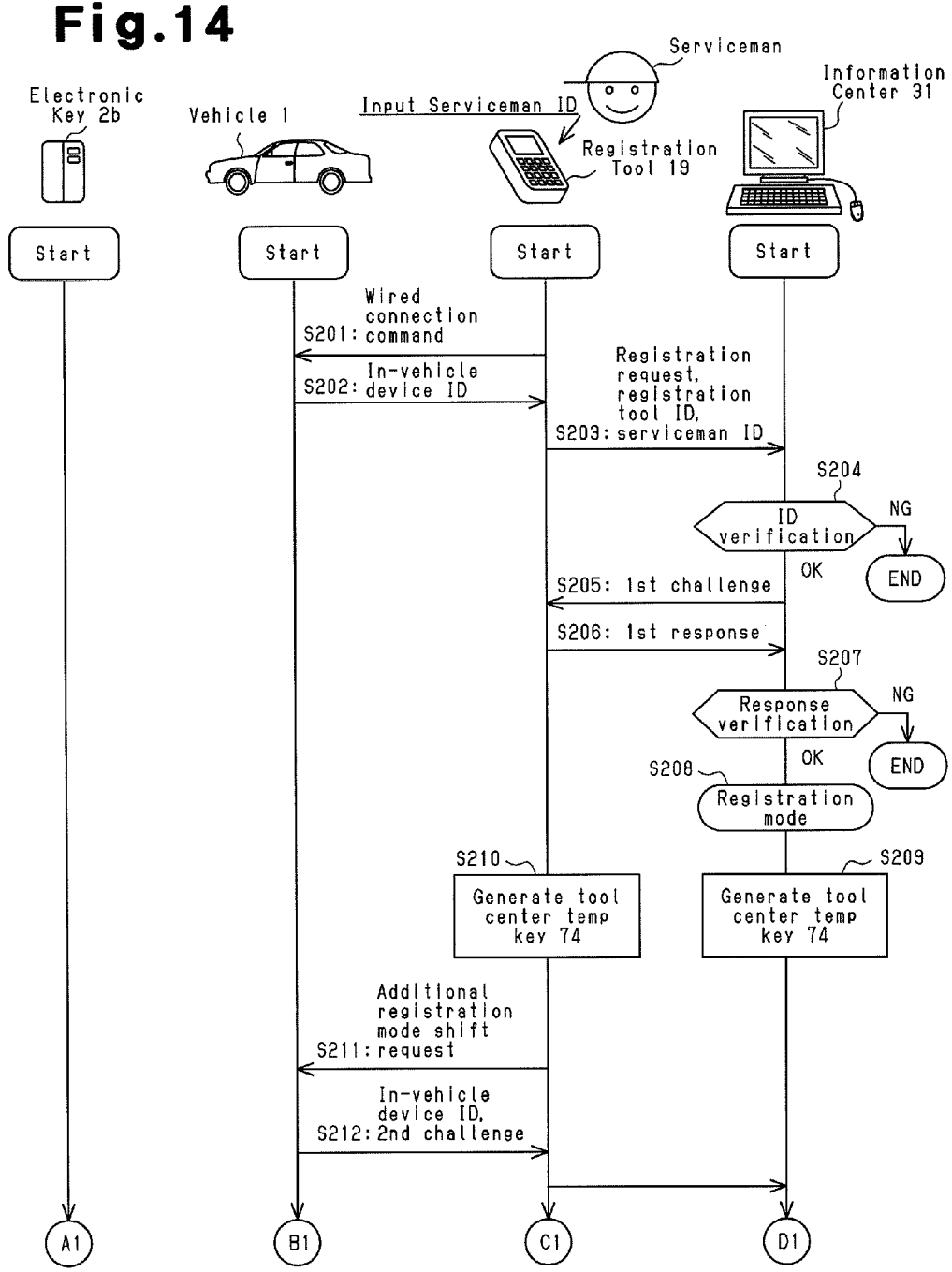
FIGS. 14 to 17 are flowcharts illustrating an additional registration.
Figure 15:
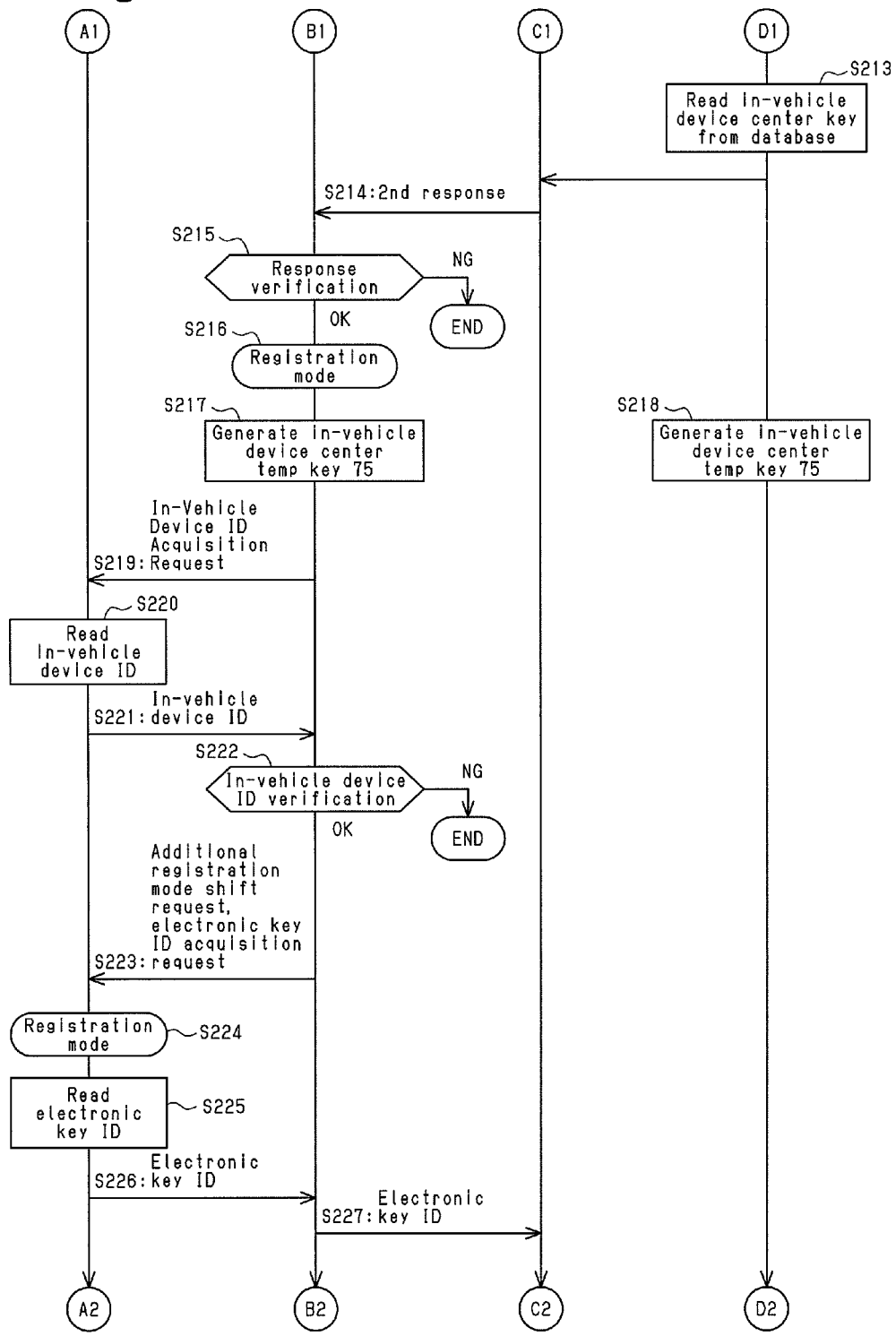
Figure 16:
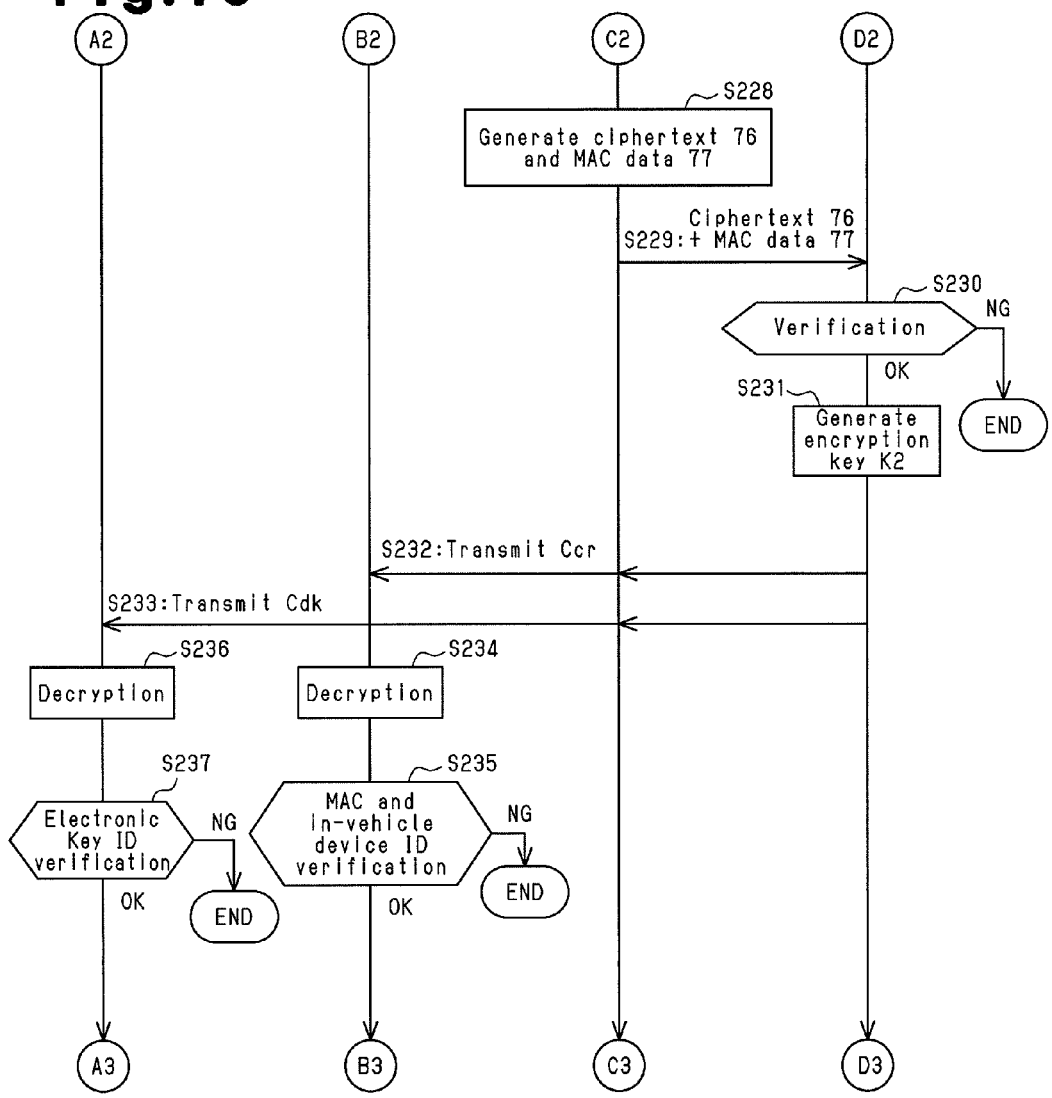
Figure 17:
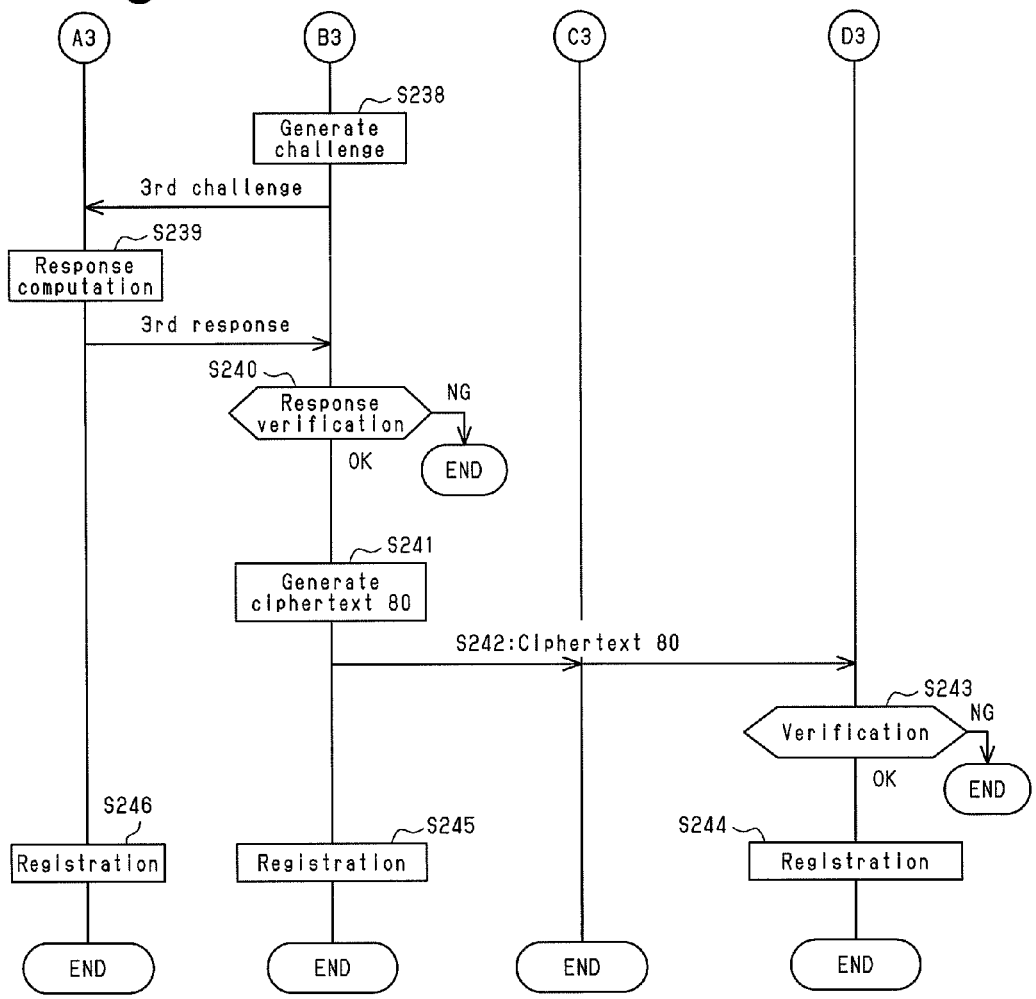

Referring to FIG. 13, in step S100, when the registration tool 15 detects an operation for starting initial registration of the electronic key 2a, the registration tool 15 provides the verification ECU 4 of the vehicle 1 with an initial registration request. In the illustrated example, the registration tool 15 provides the verification ECU 4 with an initial registration request through a wired connection communication.

In step S101, when receiving an initial registration command from the registration tool 15, the mode switching unit 25 of the verification ECU switches the operation mode of the verification ECU 4 to an initial registration mode that registers an electronic key to the verification ECU 4 for the first time under the condition that the registration permission flag Y is set in the memory 4a.

In step S102, in the initial registration mode, the in-vehicle device ID writing unit 26 transmits the in-vehicle device ID stored in the memory 4a of the verification ECU 4, for example, from the transmitter 8 to the electronic key 2a. The electronic key 2a stores the received in-vehicle device ID.

In step S103, when the receiver 11 receives the in-vehicle device ID, the key registration processor 16 of the electronic key 2a stores the in-vehicle device ID to the memory 10a.

In step S104, the key registration processor 16 prohibits the writing of the in-vehicle device ID to the memory 10a. This prevents rewriting of the in-vehicle device ID in the memory 10a.

In step S105, immediately after transmitting the in-vehicle device ID, the SEED code reading unit 27 of the verification ECU 4 transmits a SEED code transmission request, for example, from the transmitter 8 to the electronic key 2a.

In step S106, when the receiver 11 receives the SEED code transmission request, the key registration processor 16 transmits a SEED code stored in the memory 10a from the transmitter 12 in response to the request.

In step S107, when receiving the SEED code from the electronic key 2a, the encryption key generation unit 28 of the verification ECU 4 performs a computation with the SEED code and the encryption key generation logic f stored in the memory 4a to generate the encryption key K1. In this manner, the verification ECU 4 of the present example does not directly acquire the encryption key K1 from the electronic key 2a. The verification ECU 4 acquires and uses the SEED code to generate the encryption key K1.

In step S108, the encryption key registration unit 29 of the verification ECU 4 stores the encryption key K1, which is generated by the encryption key generation unit 28, in the memory 4a. As a result, the same encryption key K1 is registered to the electronic key 2a and the verification ECU 4. This allows for accomplishment of verification communication such as challenge-response verification between the electronic key 2a and the verification ECU 4.

In step S109, after registration of the encryption key K1, the encryption key registration unit 29 deletes the SEED code obtained from the electronic key 2a. Further, after registration of the encryption key K1, the encryption key registration unit 29 transmits a SEED code deletion request from the transmitter 8 to the electronic key 2a.

In step S110, when the receiver 11 receives the SEED code deletion request, the key registration processor 16 deletes the SEED code from the memory 10a.

In step S111, when the deletion of the SEED code is completed, the encryption key registration unit 29 cancels the registration permission flag Y and prohibits the use of the encryption key generation logic f in the verification ECU 4. This prohibits initial registration of an electronic key with the verification ECU 4.

In step S112, the key registration processor 16 transmits the electronic key ID that is registered to the memory 10a from the transmitter 12 to the vehicle 1.

In step S113, the key ID registration unit 30 stores the electronic key ID from the electronic key 2a in the memory 4a in association with the corresponding encryption key K1. This registers the electronic key Id, the in-vehicle device ID, and the encryption key K1 in association with one another to both of the vehicle 1 and the electronic key 2a. Steps S100 to S113 configure one example of an initial key registration step.

The registration tool 15 acquires the in-vehicle device ID, to which the encryption key K1 is registered, the electronic key ID, and the SEED code Cr used here through a wired connection communication. An operator may directly transmit a set of the registered in-vehicle device ID and SEED code from the registration tool 15 to the information center 31. Alternatively, an operator may operate an operation device of the information center 31 to provide the information center with a set of the registered in-vehicle device ID and SEED code. The information center 31 writes the acquired set of the in-vehicle device ID and the SEED code to the encryption key database 50.

Next, additional registration of the electronic key 2b to the vehicle 1 will now be described with reference to FIGS. 14 to 17. First, on a manufacturing line of the verification ECU 4, the in-vehicle device center key 33 is transmitted from the writing tool 32 to the verification ECU 4 in order to write the in-vehicle device center key 33 to the verification ECU 4 (additional controller manufacturing step). In the same manner, on a manufacturing line of the electronic key 2b, the electronic key center key 34 is transmitted from the writing tool 32 to the key controller 10 of the electronic key 2b in order to store the electronic key center key 34 in the electronic key 2b (additional electronic key manufacturing step). This registers the in-vehicle device center key 33 to the verification ECU 4, and registers the electronic key center key 34 to the key controller 10 of the electronic key 2b.

Further, a serviceman inputs a serviceman ID and a password, for example, by manually operating the operation unit 18 of the registration tool 15 or by giving biometric information to a sensor of the registration tool.

Then, in the vicinity of the vehicle 1, the serviceman prepares the electronic key 2b, which is to be additionally registered, and the registration tool 15. The registration tool 15 is connected to the vehicle 1 by the cable 23, and the registration tool 15 is set to be communicable with the information center 31 through a wireless connection. Further, the information center 31 is activated and set to start registration. Such a start condition refers to a preparation stage prior to the actual additional registration mode, and any of a number of operations may be performed to shift to the start condition.

In step S201, when the operation unit 18 of the registration tool 15 is operated to perform additional registration of the encryption key K2, the tool verification unit 72 provides the verification ECU 4 with a wired connection command as a notification to start additional registration.

In step S202, the vehicle preregistration verification unit 58 is activated upon receipt of the wired connection command. In response, the vehicle preregistration verification unit 58 transmits the in-vehicle device ID to the registration tool 15.

In step S203, when the in-vehicle device ID is obtained from the vehicle 1, the tool verification unit 72 temporarily holds the in-vehicle device ID in the memory 17a and transmits a registration request for starting the additional registration of the electronic key 2b, the registration tool ID registered to the memory 17a, and the serviceman ID (including password) input when activating the registration tool 15 to the information center 31 through wireless communication.

In step S204, the center preregistration verification unit 43, which is activated in response to the registration request from the registration tool 15, verifies the received registration ID and the serviceman ID by checking whether or not the registration ID and the serviceman ID are registered to the memory 31a. Further, the center preregistration verification unit 43 refers to the abnormal tool ID database 52 and checks whether or not a correct registration tool ID has been received. The center preregistration verification unit 43 also refers to the tool-serviceman ID to check whether or not the correct combination of the registration tool ID and the serviceman ID have been received. When the results are all favorable, the center preregistration verification unit 43 proceeds to the next step. When any of the results are unfavorable, the center preregistration verification unit 43 ends processing.

In step S205, the center preregistration verification unit 43 starts challenge-response verification with the registration using the tool center key 39. Here, the center preregistration verification unit 43 transmits a first challenge to the registration tool 15. The first challenge is a random number code that changes for each transmission.

In step S206, when receiving the first challenge from the information center 31, the tool verification unit 72 performs a calculation with the first challenge and the tool center key 39 registered to the registration tool 15 to generate a first response. The registration tool 15 then transmits the first response to the information center 31.

In step S207, when the center preregistration verification unit 43 receives the first response from the registration tool 15, the center preregistration verification unit 43 compares the received first response with a response that the center preregistration verification unit 43 computed to verify the response. In other words, the center preregistration verification unit 43 verifies the registration tool 15. When determining that the challenge-response verification with the registration tool 15 has been accomplished, the center preregistration verification unit 43 proceeds to the next step. When determining that the challenge-response verification has not been accomplished, the center preregistration verification unit 43 ends processing.

In step S208, the information center 31 proceeds to the additional registration mode and activates the center registration processor 44.

In step S209, the center verification unit 45 generates a tool center temporary (temp) key 74 with a hash function. The tool center temp key 74 may be a hash value generated by performing a computation in accordance with a hash function using the first challenge sent to the registration tool 15, the first response received from the registration tool 15, and the tool center key 39 registered to the memory 31a of the information center 31. The tool center temp key 74 functions to prevent erroneous registration of the encryption key K2.

In step S210, the tool verification unit 72 generates a tool center temp key 74 in the same manner as the information center. More specifically, the tool verification unit 72 performs a computation with the first response that the tool verification unit 72 has calculated and the tool center key 39 registered to the registration tool 15 to obtain a hash value as the tool center temp key 74.

In step S211, when the tool center temp key 74 is generated, the tool verification unit 72 provides the first verification ECU 4 of the vehicle 1 with an additional mode shift request.

In step S212, when receiving the additional registration mode shift request from the registration tool 15, the vehicle preregistration verification unit 58 provides the registration tool 15 with the in-vehicle device ID registered to the verification ECU 4. Here, the vehicle preregistration verification unit 58 starts the challenge-response verification with the in-vehicle device center key 33 and provides the registration tool 15 with the in-vehicle device ID and a second challenge. When receiving the in-vehicle device ID and the second challenge, the tool verification unit 72 provides the information center 31 with the in-vehicle device ID and the second challenge through a wireless connection.

In step S213, when the center verification unit 45 receives the in-vehicle device ID and the second challenge from the registration tool 15, the center verification unit 45 refers to the memory 31a of the information center 31 and reads the in-vehicle device center key 33 corresponding to the in-vehicle device ID. The in-vehicle device center key 33 is a value unique to each vehicle 1 and directly associated with the in-vehicle device ID, which is also a value unique to the vehicle 1. The center verification unit 45 refers to the received in-vehicle device ID to read the corresponding in-vehicle device center key 33.

In step S214, the center verification unit 45 performs a computation with the second challenge received from the registration tool 15 and the in-vehicle device center key 33 read in step S213 to generate a second response and sends the second response to the registration tool 15 through a wireless connection. When receiving the second response from the information center 31, the tool verification unit 72 provides the vehicle 1 with the second response.

In step S215, when receiving the second response from the registration tool 15, the vehicle preregistration verification unit 58 compares the second response with a response that the vehicle preregistration verification unit 58 computed to perform response verification. That is, the vehicle 1 verifies the information center 31. The vehicle preregistration verification unit 58 proceeds to the next step when the challenge-response verification with the registration tool 15 is accomplished and ends processing when challenge-response verification is not satisfied.

In step S216, the vehicle 1, namely, the verification ECU 4 shifts to the additional registration mode and activates the vehicle registration processor 24.

In step S217, the vehicle verification unit 59 generates an in-vehicle device center temporary key (hereafter referred to as the in-vehicle device center temp key 75) with a hash function. The in-vehicle device center temp key may be a hash value generated by performing a computation in accordance with a hash function using the second challenge sent to the information center 31, the second response received from the information center 31, and the in-vehicle device center key 33 registered to the memory 4a of the verification ECU 4. The in-vehicle device center temp key 75 is generated as a different value whenever a registration is performed and is valid for only one registration. The in-vehicle device center temp key 75 functions to prevent erroneous encryption key K2.

In step S218, the center verification unit 45 generates an in-vehicle device center temp key 75 in the same manner as the vehicle 1. More specifically, the center verification unit 45 performs a computation using the second challenge received from the vehicle 1, a second response calculated by the center verification unit 45, an in-vehicle device center key 33 registered to the information center 31, and a hash function to obtain a hash value as the in-vehicle device center temp key 75.

In step S219, the vehicle verification unit 59 transmits an in-vehicle device ID acquisition request from the transmitter 8 to the electronic key 2b by a wireless connection. The in-vehicle device ID acquisition request is a signal that requests the electronic key 2b to return the in-vehicle device ID.

In step S220, when receiving the in-vehicle device ID acquisition request, the key verification unit 66 reads the in-vehicle device ID registered to the electronic key 2b. If the electronic key 2b has already undergone encryption key registration, the in-vehicle device ID is already registered. Thus, the electronic key 2b is not registered. In this manner, the in-vehicle device ID registered to the electronic key 2 may be checked to determine whether or not the encryption key K2 is registered to the encryption key K2.

In step S221, the key verification unit 66 transmits the in-vehicle device ID from the transmitter 12 through a wireless connection. Here, if the electronic key 2b has already undergone key registration, the in-vehicle device ID is returned. If the electronic key 2b has not undergone key registration, the in-vehicle device ID is not returned.

In step S222, the vehicle verification unit 59 verifies the in-vehicle device ID received from the electronic key 2b. Here, the vehicle verification unit 59 compares the in-vehicle device ID received from the electronic key 2b and the in-vehicle device ID registered to the vehicle 1 to verify the in-vehicle device ID. When an in-vehicle device ID has not been registered to the electronic key 2b, the vehicle verification unit 59 proceeds to the next step. When an in-vehicle device ID has been registered to the electronic key 2b, the vehicle verification unit 59 ends processing.

In step S223, the verification ECU 4 transmits an additional registration mode shift request and an electronic key ID acquisition request to the electronic key 2b from the transmitter 8. The additional registration mode shift request is a command for shifting the electronic key 2b to the additional registration mode. Further, the electronic key ID acquisition request is a command for having the electronic key 2b return the electronic key ID to the vehicle 1.

In step S224, the electronic key 2b, namely, the key controller 10, shifts to the additional registration mode and activates the key registration processor 16.

In step S225, when the receiver 11 receives the electronic key ID acquisition request with the receiver 11, the key verification unit 66 reads the electronic key ID registered to the electronic key 2b.

In step S226, the key verification unit 66 sends the electronic key ID registered to the electronic key 2b from the transmitter 12 to the vehicle 1 through a wireless connection.

In step S227, the vehicle verification unit 59 transfers the electronic key ID received from the electronic key 2b to the registration tool 15 through wired communication.

In step S228, when receiving the electronic key ID from the vehicle 1, the tool verification unit 72 generates a ciphertext 76 and message authentication code (MAC) data 77 (manipulation detection code data).

In the preferred example, the ciphertext 76 is generated by performing a computation with the tool center key 39 and a plaintext (in-vehicle device ID, electronic key ID, first challenge) in accordance with an encryption algorithm. The first challenge in the ciphertext 76 corresponds to a challenge transmitted by the information center 31 by the registration tool 15 in step S205. The first challenge is included in the ciphertext 76 in this manner to check that the first challenge conforms to the first challenge of step S205 and confirm that the transmitted ciphertext 76 was generated in the registration process, that is, the ciphertext was not previously generated.

The MAC data 77 is used to perform MAC verification at the information center 31. The MAC verification is one type of verification that prevents the manipulation of a message. In the MAC verification, a computation is performed using a message, a key, and an encryption algorithm to generate a verification code, or the so-called MAC, that is transmitted as data to a communication peer for verification. The MAC algorithm may be an exclusively designed algorithm, an algorithm in compliance with a block encryption, such as the data encryption standard (DES) and the advanced encryption standard (AES), or an algorithm in accordance with a hash function. The MAC data 77 may be a code generated by performing a computation in accordance with a MAC algorithm using the tool center temp key 74, generated by the registration tool 15, and the ciphertext 76, which is a plaintext.

In step S229, the tool verification unit 72 transmits the ciphertext 76 and the MAC data 77 to the information center 31 through a wireless connection.

In step S230, the center verification unit 45 uses the ciphertext 76 and the MAC data 77 received from the registration tool 15 to perform MAC verification and an abnormal ID check. The center verification unit 45 checks whether or not the MAC data may be correctly decrypted with the tool center temp key 74 generated at the information center 31 to determine whether or not MAC verification has been accomplished. When MAC verification is accomplished, the ciphertext 76 is correctly acquired. Then, the center registration processor 44 decrypts the ciphertext 76 with the tool center key 39 to acquire the in-vehicle device ID, the electronic key ID, and the first challenge.

The center verification unit 45 checks whether or not the in-vehicle device ID and the electronic key ID received from the registration tool 15 are registered in the abnormal ID database 51 as an abnormal ID (abnormal ID verification). Further, the center verification unit 45 checks whether or not the first challenge in the ciphertext 76 conforms to the first challenge acquired in step S205 to determine whether or not the ciphertext 76 is correct data.

The center verification unit 45 refers to the electronic key-in-vehicle device ID combination table 54 to verify whether or the combination of the electronic key ID and the in-vehicle device ID is correct (abnormal ID check). When MAC verification is accomplished and the abnormal ID check obtains a desirable result, the center verification unit 45 proceeds to step S231. When at least one of the MAC verification and the abnormal ID check obtains an unfavorable result, the center verification unit 45 ends processing.

In step S231, the information center 31 starts transmission of the encryption key K2. For example, the random number generator 46 provides the encryption unit 47 with a random number code as the encryption key K2. The encryption unit 47 reads the used electronic key center key 34 and the in-vehicle device center key 33 from the memory 31a to encrypt the encryption key K2. In the present example, the encryption key K2 is encrypted with the electronic key center key 34 to generate the electronic key registration code Cdk. Further, the encryption key K2 is encrypted with the in-vehicle device center key 33 to generate the in-vehicle registration code Ccr.

In step S232, the registration code output unit 48 transmits the generated in-vehicle device registration code Ccr to the verification ECU 4 through the registration tool 15. The in-vehicle device registration code Ccr includes a ciphertext 78 and the MAC data 79. In the preferred example, the ciphertext 78 is generated by performing a computation on a plaintext including the in-vehicle device center key 33, the encryption key K2, the electronic key ID, and the in-vehicle device ID in accordance with an encryption algorithm. Further, the MAC data 79 may be a code generated by performing a computation on the in-vehicle device center temp key 75 and the ciphertext 78 in accordance with a MAC algorithm.

In step S233, the registration code output unit 48 sends the generated electronic key registration code Cdk to the electronic key 2b through the registration tool 15 and the vehicle 1. The electronic key registration code Cdk may be a ciphertext encrypted by the electronic key center key 34. In the preferred example, the electronic key registration code Cdk is a ciphertext generated by performing a computation on a plaintext including the electronic key center key 34, the encryption key K2, the in-vehicle device ID, and the electronic key ID in accordance with an encryption algorithm.

In step S234, the in-vehicle device registration code acquisition unit 60 of the verification ECU 4 acquires the in-vehicle device registration code Ccr from the information center 31, and the decryption unit 61 decrypts the in-vehicle registration code Ccr. In one example, the decryption unit 61 performs a computation on the ciphertext 78 in the in-vehicle device registration code Ccr and the in-vehicle device center key 33 stored in the memory 4a to decrypt the ciphertext 78. Further, the decryption unit 61 decrypts the MAC data 79 in the in-vehicle device registration code Ccr to decrypt the in-vehicle device center temp key 75 generated in the vehicle 1.

In step S235, the in-vehicle device registration code determination unit 62 checks whether or not the decrypted MAC data 79 has been correctly decrypted (MAC verification). When the MAC verification is accomplished, it is determined that the ciphertext 78 has been correctly decrypted. Further, the in-vehicle device registration code determination unit 62 checks whether or not the in-vehicle device ID obtained by decrypting the ciphertext 78 conforms to the in-vehicle device ID that is registered to the vehicle 1 (in-vehicle device ID verification). When the MAC verification and the in-vehicle device ID verification are both accomplished, the in-vehicle device registration code determination unit 62 proceeds to step S236. When at least one of the MAC verification and the in-vehicle ID verification is not accomplished, the in-vehicle device registration code determination unit 62 ends processing.

In step S236, the electronic key registration code acquisition unit 67 of the key controller 10 acquires the electronic key registration code Cdk from the information center 31, and the decryption unit 61 decrypts the electronic key registration code Cdk. In one example, the decryption unit 61 performs a computation with the electronic key registration code Cdk, acquired from the information center 31, and the electronic key center key 34, written to the memory 10a, to decrypt the electronic key registration code Cdk.

In step S237, the electronic key registration code determination unit 69 checks whether or not the electronic key ID obtained by decrypting the electronic key registration code Cdk conforms to the electronic key ID registered to the electronic key ID (electronic key ID verification). When the electronic key ID verification is accomplished, the electronic key registration code determination unit 69 shifts to step S238. When the electronic key ID verification is not accomplished, the electronic key registration code determination unit 69 ends processing.

In step S238, the vehicle verification unit 59 starts a challenge-response verification with the encryption key K2 to check whether or not the encryption key K2 received from the information center 31 is correct. In one example, the vehicle verification unit 59 generates a third challenge and transmits the third challenge to the electronic key 2 from the transmitter 8.

In step S239, when the third challenge is received from the vehicle 1, the key verification unit 66 performs a computation with the third challenge and the encryption key K2 obtained by the electronic key 2b from the information center 31 to generate a third response. Then, the key verification unit 66 transmits the third response from the transmitter 12 to the vehicle 1.

In step S240, the vehicle verification unit 59 compares the third response received from the electronic key 2b with a response generated by the vehicle verification unit 59 through a computation performed in the same manner to check whether or not the two responses are in conformance (response verification). When the challenge-response verification with the electronic key 2b is accomplished, the vehicle verification unit 59 proceeds to step S241. When the challenge-response verification is not accomplished, the vehicle verification unit 59 ends processing.

In step S241, the vehicle verification unit 59 generates a ciphertext 80. In the preferred example, the ciphertext 80 is generated by performing a computation with the in-vehicle device center temp key 75, generated by the vehicle 1, a plaintext (in-vehicle device ID, electronic key ID, and result) in accordance with an encryption algorithm. The result included in the ciphertext 80 may be a notification indicating that the electronic key 2b has been verified.

In step S242, the vehicle verification unit 59 provides the information center 31 with the generated ciphertext 80 through the registration tool 15.

In step S243, the center verification unit 45 uses the ciphertext 80 to perform in-vehicle device ID and electronic key ID verification. For example, when receiving the ciphertext 80 from the vehicle 1, the center verification unit 45 decrypts the ciphertext 80 with the in-vehicle device center temp key 75 generated by the information center 31. Then, the center verification unit 45 checks whether or not the in-vehicle device ID and the electronic key ID included in the ciphertext 80 corresponds to an abnormal ID stored in the database 51. When the vehicle device ID and the electronic key ID are both verified, the center verification unit 45 proceeds to step S244. When at least one of the in-vehicle device ID and the electronic key ID is not verified, the center verification unit 45 ends processing.

In step S244, the ID pair registration unit 49 registers, to the memory 31a, the in-vehicle device ID, the electronic key ID, and the encryption key K2 that are subject to registration in association with one another. This completes the registration to the information center 31.

After transmitting the ciphertext 80 to the information center 31, in step S245, the vehicle registration unit 63 registers, to the memory 4a, the in-vehicle device ID and the encryption key K2 that are subject to registration in association with one another. This completes the registration to the vehicle 1.

After transmitting the third response to the vehicle 1, in step S246, the key registration unit 70 registers, to the memory 10a, the in-vehicle device ID and the encryption key K2 that are subject to registration in association with one another. This completes the registration to the electronic key 2b. Steps S201 to S246 configure one example of an additional key registration step.

The present embodiment has the advantages described below.

(1) Initial registration of an electronic key (e.g., registration performed in a vehicle manufacturing factory) is performed in compliance with the SEED registration protocol that does not involve network communication. Additional registration of an electronic key (e.g., registration performed in a dealer or an auto repair garage after the vehicle is shipped out of a factory) is performed in compliance with a network registration protocol. Since the initial registration does not involve network communication, key registration is not affected by unstable network communication. This ensures that initial registration of an electronic key is performed, and the manufacturing of vehicles (vehicle manufacturing line) is not stopped by unstable network communication. Additional registration accesses an information center through a network and thereby increases security.

(2) In the initial registration, a computation is performed with the SEED code Cr and the encryption key generation logic f to generate the encryption key K1. Thus, the encryption key K1 is generated with a high level of security.

(3) The initial registration uses the registration tool 15. Thus, the encryption key K1 may be registered to the vehicle 1 and the electronic key 2a with a high level of security. Further, the additional registration uses the registration tool 15. Thus, the encryption key K2 may be registered to the vehicle 1 and the electronic key 2b with a high level of security.

(4) In the initial registration, when the registration of the encryption key K1 is completed, the SEED code Cr is deleted from the electronic key 2a. This makes it difficult to steal the encryption key K2.

(5) The in-vehicle device registration code Ccr includes information encrypted with the in-vehicle device center temp key 75 that is valid for only one use during registration. The in-vehicle device registration code Ccr is a value that changes whenever a registration is performed. Thus, analysis of the in-vehicle device registration code Ccr is difficult, and theft of the encryption key K2 is difficult. The same applies to the tool center temp key 74.

(6) In an additional registration, to register the encryption key K2 to the vehicle 1 and the electronic key 2b, challenge-response verifications between the vehicle 1 and the registration tool 15 and between the registration tool 15 and the information center 31 are required to be accomplished. Thus, unauthorized registration of the encryption key K2 is difficult.

(7) In an additional registration, MAC verification is required to be accomplished to register the encryption key K2 to the vehicle 1 and the electronic key 2b.

(8) In an additional registration, an abnormal ID check is required to be cleared in order to register the encryption key K2 to the vehicle 1 and the electronic key 2b. For example, when the ID of the vehicle 1 or the electronic key 2b is an ID of a stolen vehicle or an ID registered to another vehicle, the registration of the encryption key K2 is not permitted. Thus, unauthorized registration of the encryption key K2 is difficult.

(9) In an additional registration, the registration tool ID and the serviceman ID are required to be verified to register the encryption key K2 to the vehicle 1 and the electronic key K2. Thus, unauthorized registration of the encryption key K2 is difficult.

(10) In an additional registration, the combination of the registration tool ID and the serviceman ID has to be correct to register the encryption key K2 to the vehicle 1 and the electronic key 2b. When the combination of the registration tool ID and the serviceman ID is not correct, registration of the encryption key K2 is not permitted. Thus, unauthorized registration of the encryption key K2 is difficult.

(11) The in-vehicle device registration code Ccr includes a ciphertext and MAC data (manipulation detection code). Thus, analysis of the in-vehicle registration code Ccr is difficult.

It should be apparent to those skilled in the art that the present invention may be embodied in many other specific forms without departing from the spirit or scope of the invention. Particularly, it should be understood that the present invention may be embodied in the following forms.

Figure 18:
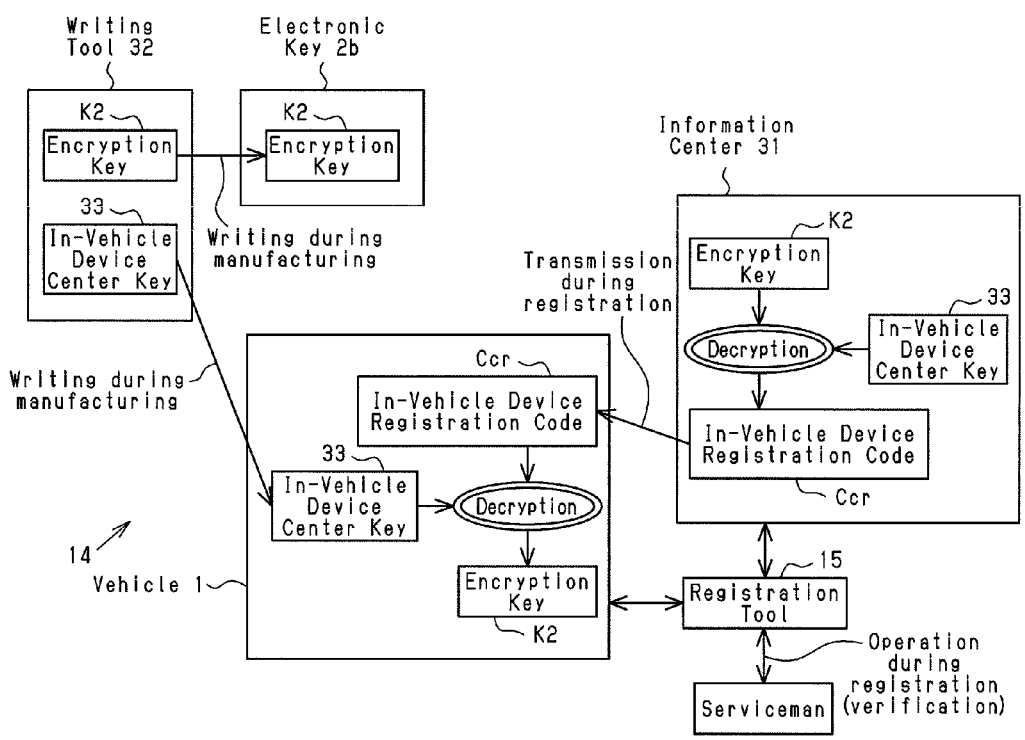
FIG. 18 is a block diagram showing a further example of an electronic key registration system.

Referring to FIG. 18, the electronic key 2b used for additional registration may be provided with the encryption key K2 in advance. The information center 31 may receive an encryption key K2 and an in-vehicle device center key 33 from the writing tool or may send an encryption key K2 and an in-vehicle device center key 33 to the writing tool in advance. In this case, the information center 31 transmits only the in-vehicle device registration code Ccr to the vehicle 1. This simplifies the registration of the encryption key K2.

To perform additional registration to an electronic key 2 through a network, the encryption key K2 may be written beforehand to the verification ECU 4 when the verification ECU 4 is manufactured.

In an initial registration, the SEED code Cr is preferably deleted from the electronic key 2a. However, the use of the SEED code Cr may be prohibited.

In an initial registration, the encryption key K1 may be generated without using the encryption key generation logic f. The SEED code Cr may be generated from the encryption key K1 with an inverse function of the encryption key generation logic f. The encryption key generation logic f may be changed.

The writing performed by the writing tool 32 does not necessarily have to be performed through a wired connection and may be performed through a wireless connection.

A plurality of vehicles 1 (ID codes of the vehicles 1) may be registered to a single electronic key 2. In this case, when one or more encryption keys K are written to the electronic key 2 (same encryption key may be shared by a plurality of vehicles 1) and one encryption key K written to the electronic key 2 is used as an encryption key K of another vehicle 1, an unused encryption key K is encrypted and provided from the information center 31 to the vehicle 1. The vehicle 1 decrypts and registers the encryption key K. In this case, a single electronic key 2 may be shared by a plurality of vehicles 1. This improves convenience.

When performing key registration (initial registration or additional registration) with, for example, the transmitter 8 that is located in the vehicle, the registration may be performed in the vehicle.

The intensity of the transmitter 8 may be adjusted to reduce the transmission area of the transmitter 8 in size during key registration as compared to when verification is performed.

The network communication of the information center 31 is not limited to IP communication and various types of communication protocols may be employed. Further, the communication frequency may be changed.

Communication between the registration tool 15 and the information center 31 may be performed through the G-Book communication device 56 of the vehicle 1. Further, communication between the vehicle 1 and the registration tool 15 does not have to be performed through a wired connection and may be performed through a wireless connection.

A hash function does not necessarily have to be used when generating the tool center temp key 74 and the in-vehicle device center temp key 75. Other functions and encryption codes may be used instead.

The verification performed when the electronic key registration system 14 enters the registration mode during an additional registration, challenge-response verification does not necessarily have to be performed. A different verification may be performed instead.

Preferably, the electronic key registration system 14 enters an additional registration when the verifications for entering the additional registration mode are all accomplished as described above. In a further example, when at least one of the verifications described in the above embodiment is accomplished, the electronic key registration system 14 enters the additional registration mode. In this case, the one verification is preferably selected to indicate accomplishment of the other verifications.

The first to third challenge-response verifications do not have to use different keys and may use the same key.

The verification performed in steps S235 and S243 is not limited to MAC verification and may be a different verification.

Various types of encryption protocols, such as AES and DEC may be employed to generate a ciphertext.

The communication between the vehicle 1 and the information center 31 does not have to use the G-Book communication device 56 and may be performed in a different manner.

The in-vehicle device registration code Ccr does not have to be directly transmitted from the information center 31 to the vehicle 1 and may be provided to the vehicle 1 through the registration tool 15. This also applies to the electronic key registration code Cdk.

The in-vehicle device registration code Ccr is not limited to data configured by a ciphertext and a MAC text. For example, the in-vehicle device registration code Ccr may be data configured by only a ciphertext.

A restriction key is not limited to the tool center temp key 74 and the in-vehicle device center temp key 75 as long as the restriction key is valid for only one registration.

The ID verification that checks the operator who is performing registration does not necessarily have to verify both of the tool ID and the serviceman ID and may verify only one of the tool ID and the serviceman ID.

The ID related to the operator is not necessarily limited to the serviceman ID assigned to each serviceman and may by any information that allows for the operator to be distinguished.

The in-vehicle device center key 33 only needs to be an encryption key held by both of the vehicle 1 and the information center 31. The electronic key center key 34 only needs to be an encryption key held by both of the electronic key 2 and the information center 31.

The commands and instructions in the above embodiment may be information such as a binary digit string.

The electronic key system 3 may be a wireless key system that starts verification triggered by a signal sent from the electronic key 2.

The communication protocol, frequency, and configuration of the electronic key system 3 may be changed.

The identification information unique to the communication subject is an in-vehicle device ID in the preferred example. However, the identification information may be any information that allows for identification of the verification ECU 4.

The electronic key registration system 14 does not have to include one or both of the registration tool 15 and the writing tool 32 as long as one or both of the vehicle 1 and the electronic key 2 is provided with the functions of the registration tool 15 and the writing tool 32.

In the preferred example, the communication subject is a vehicle 1. Instead, the communication subject may be a system, device, or apparatus other than a vehicle.

The above embodiment and examples include the technical concepts listed below.

(a) The initial encryption generation code is deleted after an initial registration is completed. This further increases the effect for preventing unauthorized registration of the electronic key.

(b) The initial key registration step and the additional key registration step are performed by a dedicated registration tool. In this case, the registration tool has to be in reach for a person to perform key registration. This further increases the effect for preventing unauthorized registration of the electronic key.

(c) The additional key registration step includes encryption and decryption using a restriction key that is usable for only one key registration. In this configuration, the key that encrypts the encryption key is changed whenever a registration is performed. Thus, it is further difficult to steal the encryption key.

(d) In the additional key registration step, before the communication subject, the electronic key, and the information center enter the registration mode, communication peer verification is performed to verify a communication peer, and the communication subject, the electronic key, and the information center enter the registration mode under the condition that the verification is accomplished. In this configuration, the verification accomplishment is a condition for shifting to the registration mode when registering the encryption key. Thus, unauthorized registration of the encryption key is more difficult.

(e) In the additional key registration step, after the vehicle, the electronic key, and the information center all enter the registration mode, the vehicle, the electronic key, and the information center are all verified before an actual registration is performed. In this configuration, a communication peer is verified also after entering the registration mode. Thus, unauthorized registration of a private key is more difficult.

(f) In the additional key registration step, at least one of a registration tool, which functions as an operation terminal when performing the registration, and an operator, who performs the registration, is verified, and registration of the encryption key is permitted under the condition that the verification is accomplished. In this configuration, accomplishment of the registration tool or the operator is also a condition for performing registration. Thus, unauthorized registration of the encryption key is more difficult.

(g) In the additional key registration step, during each of the verifications performed after the registration mode, when an ID of a communication peer is an abnormal ID, registration of the encryption key is prohibited. In this configuration, when the ID of an electronic key, a vehicle, or the like where the encryption key is registered includes an abnormal ID, registration of the encryption key cannot be performed. Thus, unauthorized registration of the encryption key is more difficult.

(h) In the additional key registration step, when the IDs acquired during registration of the encryption key are not in a predetermined combination, the registration of the encryption key is prohibited. In this configuration, normal combination of the IDs is also a condition for performing registration. Thus, unauthorized registration of the encryption key is more difficult.

The present examples and embodiments are to be considered as illustrative and not restrictive, and the invention is not to be limited to the details given herein, but may be modified within the scope and equivalence of the appended claims.

The invention claimed is:

1. An electronic key registration system, comprising:
an electronic key system controller installed in a vehicle;
an electronic master key device, including a memory, that performs encrypted communication with the vehicle, wherein the electronic master key device includes an initial encryption key generation code;
an electronic sub-key device that performs encrypted communication with the vehicle, wherein the electronic sub-key device differs from the electronic master key device, and wherein the electronic master key device and the electronic sub-key device each include a transmitter that performs encrypted wireless communication with the electronic key system controller of the vehicle when entering a vehicle interior communication area and in a vehicle exterior communication area; and
an information center including an additional encryption key, wherein
the electronic master key device memory is configured to store an initial encryption key generated through a computation using the initial encryption key generation code and an initial encryption key generation logic,
the controller holds the initial encryption key generation logic and identification information unique to the vehicle,
the controller is programmed to acquire the initial encryption key generation code from the electronic master key device, generate an initial encryption key by performing a computation using the acquired initial encryption key generation code and the initial encryption key generation logic held by the controller, and store the generated initial encryption key, and the information center is configured to send the additional encryption key to at least one of the electronic sub-key device and the controller through a network.

2. The electronic key registration system according to claim 1, wherein
the information center holds the identification information of the vehicle and a controller-dedicated key associated with the identification information of the vehicle;
the controller is configured to hold a controller-dedicated key that is the same as the controller-dedicated key of the information center;
the information center is programmed to generate an additional controller encryption code by encrypting the additional encryption key with the controller-dedicated key of the information center, and transmit the additional controller encryption code to the controller through the network; and
the controller is programmed to decrypt the additional encryption key with the additional controller encryption code, which is received from the information center, and the controller-dedicated key, which is held by the controller, and hold the decrypted additional encryption key.

3. The electronic key registration system according to claim 1, wherein
the information center holds an electronic key ID of the electronic sub-key device and an electronic sub-key device-dedicated key associated with the electronic key ID;
the electronic sub-key device includes a memory configured to store an electronic sub-key device-dedicated key that is the same as the electronic sub-key device-dedicated key of the information center;
the information center is programmed to generate an electronic sub-key device encryption code by encrypting the additional encryption key with the electronic sub-key device-dedicated key of the information center, and transmit the electronic sub-key device encryption code to the electronic sub-key device through the network; and
the electronic sub-key device is programmed to decrypt the additional encryption key with the electronic sub-key device encryption code, which is received from the information center, and the electronic sub-key device-dedicated key, which is held by the electronic sub-key device, and hold the decrypted additional encryption key.

4. The electronic key registration system according to claim 1, wherein the additional encryption key is stored in the electronic sub-key device when the electronic sub-key device is manufactured.

5. The electronic key registration system according to claim 1, wherein the additional encryption key is stored in the controller when the controller is manufactured.

6. A method for registering an electronic master key device and an electronic sub-key device to an electronic key system controller installed in a vehicle, wherein the electronic master key device and the electronic sub-key device each include a transmitter that performs encrypted wireless communication with the electronic key system controller of the vehicle when entering vehicle interior communication area and in a vehicle exterior communication area, the method comprising:
storing an initial encryption key generation code and an initial encryption key, which is generated by performing a computation with the initial encryption key generation code and an initial encryption key generation logic, in the electronic master key device;

storing identification information, which is unique to the vehicle, and the initial encryption key generation logic in the controller;

acquiring the initial encryption key generation code from the electronic master key device, generating an initial encryption key by performing a computation with the acquired initial encryption key generation code and the initial encryption key generation logic held by the controller, and storing the generated initial encryption key in the controller; and an additional key registration process that includes transmitting an additional encryption key from an information center to at least one of the electronic sub-key device and the controller through a network.

7. The method according to claim 6, wherein the information center holds the identification information of the vehicle and a controller-dedicated key associated with the identification information of the vehicle, the method further comprises storing a controller-dedicated key, which is the same as the controller-dedicated key of the information center, in the controller, the additional key registration process further includes
generating an additional controller encryption code with the information center by encrypting the additional encryption key with the controller-dedicated key of the information center;

transmitting the additional controller encryption code from the information center to the controller through the network; and decrypting the additional encryption key with the controller using the additional controller encryption code, which is received from the information center, and the controller-dedicated key, which is held by the controller, and holding the decrypted additional encryption key with the controller.

8. The method according to claim 6, wherein the information center holds an electronic key ID of the electronic sub-key device and an electronic key-dedicated key associated with the electronic key ID, the method further comprises storing an electronic sub-key device-dedicated key, which is the same as the electronic sub-key device-dedicated key of the information center, in the electronic sub-key device, the additional key registration process further includes
generating an electronic sub-key device encryption code with the information center by encrypting the additional encryption key with the electronic sub-key device-dedicated key of the information center;

transmitting the electronic sub-key device encryption code from the information center to the electronic sub-key device through the network; and decrypting the additional encryption key with the electronic sub-key device using the additional controller encryption code, which is received from the information center, and the electronic sub-key device-dedicated key, which is held by the electronic sub-key device, and holding the decrypted additional encryption key with the electronic sub-key device.

9. The method according to claim 6, further comprising:
storing the additional encryption key in the electronic sub-key device when the electronic sub-key device is manufactured.

10. The method according to claim 6, further comprising:
storing the additional encryption key in the controller when the controller is manufactured.

* * * * *